United States Patent [19]
Nakajima et al.

[11] Patent Number: 5,637,928
[45] Date of Patent: Jun. 10, 1997

[54] ON-VEHICLE SOUND INSTRUMENT

[75] Inventors: Yukihiro Nakajima; Motoki Nojiri; Kazuhisa Uchida, all of Yokohama, Japan

[73] Assignee: Shintom Co., Ltd, Yokohama, Japan

[21] Appl. No.: 362,426

[22] PCT Filed: Apr. 28, 1994

[86] PCT No.: PCT/JP94/00732

§ 371 Date: Jan. 25, 1995

§ 102(e) Date: Jan. 25, 1995

[87] PCT Pub. No.: WO94/25309

PCT Pub. Date: Nov. 10, 1994

[30] Foreign Application Priority Data

Apr. 30, 1993 [JP] Japan ..................... 5-128162
Apr. 30, 1993 [JP] Japan ..................... 5-128163

[51] Int. Cl.$^6$ .................. H04B 1/08; B60R 11/00
[52] U.S. Cl. .................. 307/10.2; 307/10.1; 340/425.5; 369/11; 455/346
[58] Field of Search ................ 307/9.1, 10.1, 307/10.2, 1 B, 119; 200/50 A, 50 R, 50 AA, 50 B, 50 C, 61.58 R, 50.01, 50.02, 50.17, 50.21, 50.32, 50.36, 50.39, 50.1; 361/212, 216, 220, 616, 644, 645, 647, 657, 680, 681; 369/11, 21; 455/345–349; 340/425.5, 426, 687, 693

[56] References Cited

U.S. PATENT DOCUMENTS

| | | |
|---|---|---|
| 4,083,620 | 4/1978 | Burgin . |
| 4,945,335 | 7/1990 | Kimura et al. ............. 307/10.2 |
| 5,124,877 | 6/1992 | Graham ................. 361/212 |
| 5,202,585 | 4/1993 | Aoyagi et al. ............. 307/10.1 |
| 5,245,511 | 9/1993 | Watanabe ................ 455/346 |
| 5,359,230 | 10/1994 | Namiki et al. ............. 307/10.1 |
| 5,434,753 | 7/1995 | Watanabe ................ 455/345 |

FOREIGN PATENT DOCUMENTS

| | | |
|---|---|---|
| 0 448 864 A3 | 10/1991 | European Pat. Off. . |
| 0 451 406 A1 | 10/1991 | European Pat. Off. . |
| 0 507 990 A1 | 10/1992 | European Pat. Off. . |
| 0 513 795 A2 | 11/1992 | European Pat. Off. . |
| 0 513 795 A3 | 11/1992 | European Pat. Off. . |
| 0 529 996 A1 | 3/1993 | European Pat. Off. . |
| 40 08 536 A1 | 10/1990 | Germany . |
| 41 18 296 A1 | 12/1991 | Germany . |
| 1-124980 | 5/1984 | Japan . |
| 4-271938 | 9/1992 | Japan . |
| 4-125951 | 11/1992 | Japan . |
| 4-358940 | 12/1992 | Japan . |
| 5-90674 | 12/1993 | Japan . |

*Primary Examiner*—Richard T. Elms
*Attorney, Agent, or Firm*—Oliff & Berridge

[57] ABSTRACT

An on-vehicle sound instrument with a face plate which does not require any switch mounted thereon to improve portability is not started unless the face plate is mounted on an instrument body, and even if any switch in the instrument body is manipulated. The face plate (30) detachably mounted on the instrument body (10) does not have any switch mounted thereon and includes operation keys (320). The instrument body (10) includes a microcomputer (40) for controlling sound signal outputs and adjustments and an input unit (44) formed of switches for inputting various data to the microcomputer (40) through inputs from the operation keys (320). When the face plate (30) is removed from the instrument body (10) and, for example, a power switch is turned on, a start setting device (60) prevents the microcomputer (40) from activating. The start setting device (60) includes two switches (62, 64) which are simultaneously turned on when the face plate (30) is dismounted from the instrument body (10). When both switches (62, 64) are in their ON state, the chip enable terminal of the microcomputer (40) becomes low. As a result, the microcomputer (40) is not started to activate the instrument body (10).

24 Claims, 20 Drawing Sheets

FIG. 1
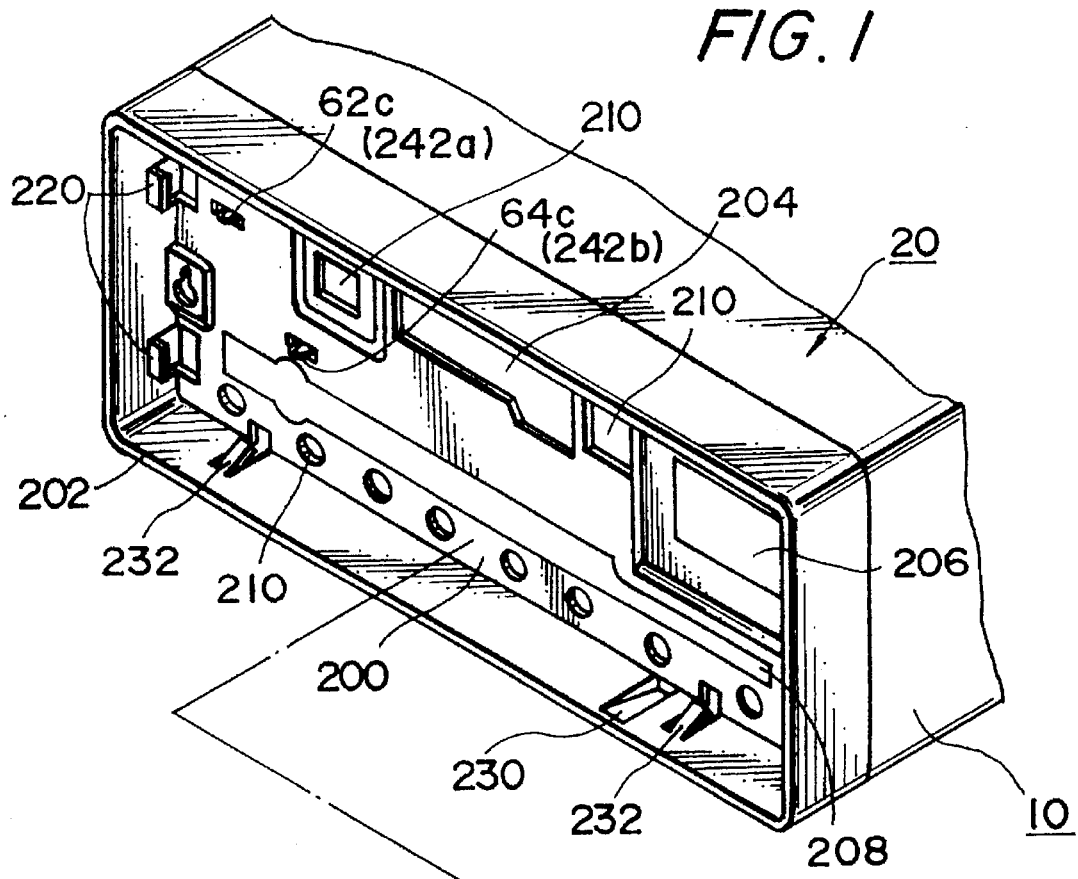
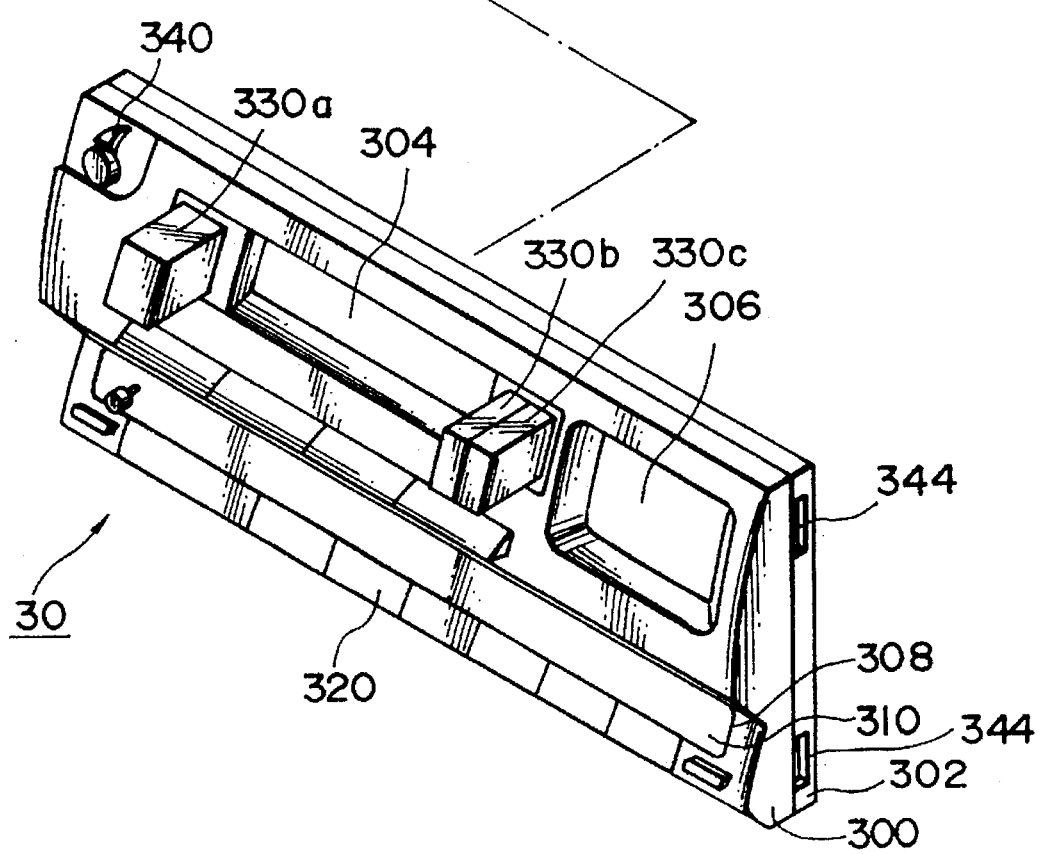

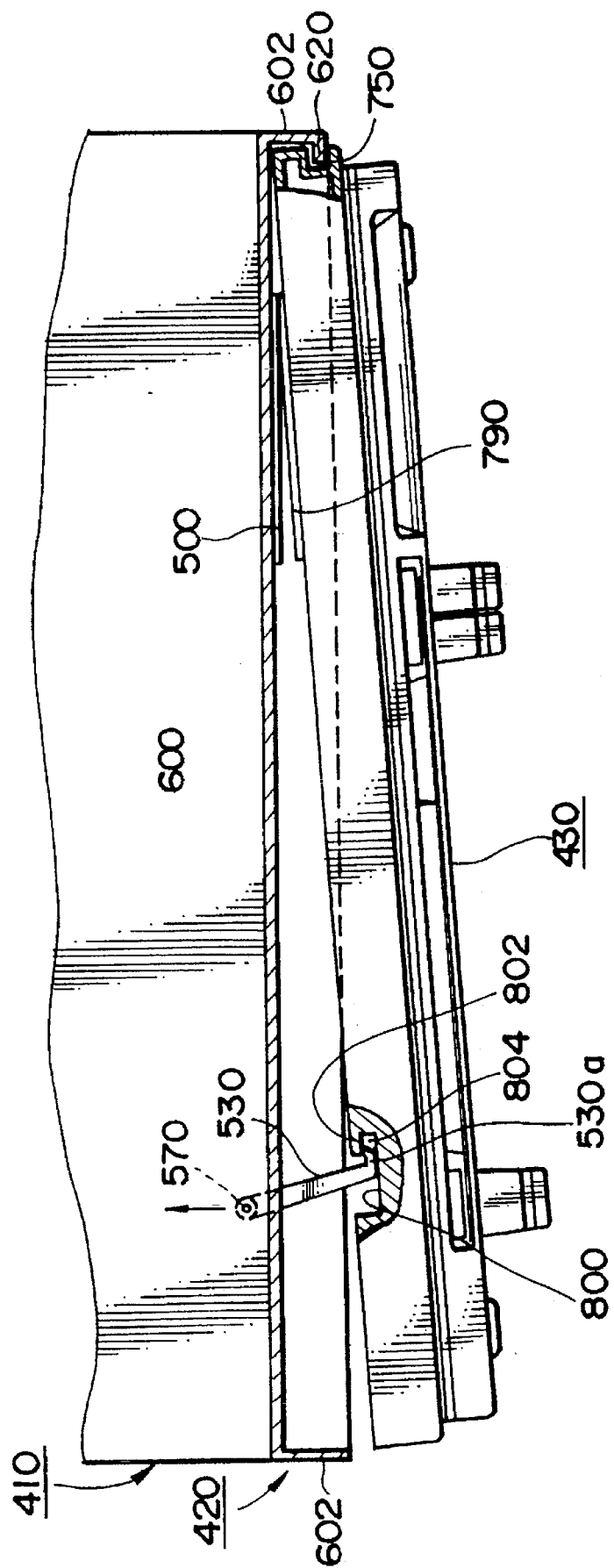

ON-VEHICLE SOUND INSTRUMENT

TECHNICAL FIELD

The present invention relates to an on-vehicle sound instrument comprising a main instrument body fixedly mounted on a vehicle, and a portable face plate detachably mounted on the instrument body.

BACKGROUND ART

On-vehicle sound instruments such as car radios are often stolen on parking. Various improvements for preventing thefts have been made on the instruments.

One improvement is that a car radio comprising a main body and a face plate integrally fixed to the main body is detachably mounted on a vehicle-side mount. Such an improvement is superior in that the integral unit of instrument body and face plate can be removed and carried from the car and thus preventing potential thefts. It is however inferior in that the instrument body is relatively heavy.

Another improvement is that an on-vehicle sound instrument comprises a main instrument body fixedly mounted on a vehicle and only a face plate is detachable from the instrument body. The face plate includes various operation keys and indicators disposed on its front panel. Thus, the interior of the face plate includes switches activated by the operation keys, display such as liquid-crystal elements, lamps for providing operational indications and guidance to a user and other elements. These electronic/electric parts are mounted, for example, on a single circuit board. In addition, various connectors are disposed on the backside of the face plate, and are connected to the circuit board of the face plate. On the other hand, the instrument body fixedly mounted on the vehicle includes counterpart connectors which are to be electrically connected to the connectors of the face plate, respectively.

As for the latter instrument, the instrument body fixed on the vehicle cannot be started, if the face plate superior in portability is removed from the vehicle. Thus, the instrument body can be prevented from being stolen.

Since the prior art sound instrument with the detachable face plate includes the electronic/electric circuits and circuit board mounted on the side of the face plate, the connectors in the face plate must be connected to or disconnected from those of the instrument body, each time the face plate is mounted on or dismounted from the instrument body. The connectors are connected and disconnected so often as the driver gets on and off the vehicle, and it may result in poor connections. Moreover, the face plate is not necessarily always mounted on the instrument body in the proper orientation. In general, as for the face plate holding mechanisms of such a type, the face plate is mounted on or dismounted from the holder of the instrument body while rotating the face plate around a point at which the right side of the face plate engages the holder. This causes a relatively large load to the holes and pins in the male and female connectors, leading to further increase in poor connections mentioned above.

When the electronic/electric parts and circuit board are mounted on the face plate, an input section including various input switches as well as an output section including liquid-crystal displays and others are disposed on the face plate. This means that the instrument body is entirely separated from the input/output sections. Although such a structure can prevent potential thefts, it is very inconvenient for the manufacture of the on-vehicle sound instrument. This is because a performance test should be carried out in each manufacturing stage. Such a performance test can be made only when the face plate is actually mounted on the instrument body. This means that the face plate is frequently mounted on and dismounted from the instrument body throughout the manufacturing process.

The circuit board in the face plate must solely be subjected to its own performance test.

If the connectors are externally exposed from the face plate and instrument body, the following problems may be raised. When the portable face plate is solely carried or stored, the exposed pins, for example, in the face plate connectors may be damaged accidentally. In such a case, the sound instrument becomes unusable. Further, the exposed connectors may be broken intentionally by a thief.

Similarly, when the electronic/electric circuits and circuit board are mounted on the face plate, the following problems may be raised. The connectors in the face plate must be connected to or disconnected from those of the instrument body each time the face plate is mounted on or dismounted from the instrument body. Such connections and disconnections are repeated each time the driver gets on and off the vehicle. Further, the following problem is raised when the face plate is mounted on the instrument body.

A problem is raised when the driver turns OFF the ignition leaving the power of the car radio ON, and consecutively turns ON the ignition before mounting the face plate. In such a case, the instrument body may be started before all the terminals in the connectors of the instrument body and face plate are connected together. This is caused when the power switch terminals in the face plate are connected to the corresponding terminals in the instrument body before all the other terminals are completely connected to one another.

At this point, for example, a microcomputer in the instrument body is started immediately. A false signal other than normal signals may be input into the microcomputer since not all the terminals are connected. Thus, the microcomputer does not function properly even after all the terminals are in contact with one another. For example, even if the operation keys on the face plate are activated, the microcomputer does not operate at all. Further, the liquid-crystal display in the face plate is disturbed since it does not receive any normal drive signal.

Such a problem is raised when the face plate is not mounted on the instrument body in the proper orientation. This is because the connector terminals are sequentially connected to one another, starting from one end in the connector array. This problem tends to occur depending on the mounting mechanism in the face plate, for example, a mounting mechanism in which the face plate is mounted on or dismounted from the instrument body while rotating the face plate around a point where one side of the face plate is engaged with the instrument body.

DISCLOSURE OF THE INVENTION

It is therefore an object of the present invention to provide an on-vehicle sound instrument comprising an instrument body fixedly mounted on a vehicle and a face plate detachably mounted on the instrument body. The mounting and dismounting of the face plate does not require any connector while the instrument body is startable only when the face plate is on the instrument body.

Another object of the present invention is to provide an on-vehicle sound instrument which can prevent any harmful influence from the sequence of connection between the connector terminals in the instrument body and face plate.

The present invention thus provides an on-vehicle sound instrument comprising:

an instrument body fixedly mounted on a vehicle;

a portable face plate detachably mounted on said instrument body;

said face plate including a plurality of operation keys for activating said instrument body in various different modes;

said instrument body having all electronic/electric parts for outputting and adjusting sound signals, including switches activated by said operation keys; and start setting means for placing said instrument body in a startable state only when said face plate is on said instrument body.

According to the on-vehicle sound instrument of the present invention, the face plate detachably mounted on the instrument body which is fixedly mounted on the vehicle does not have electronic/electric parts required to output and adjust the sound signals. Therefore, the mounting and dismounting of the face plate on the instrument body does not require any connector.

When the face plate is mounted on the instrument body, the start setting means sets the instrument body in a startable state. When the power is turned on, therefore, the operation keys in the face plate can be manipulated to activate the switches on the instrument body and to output and adjust the sound signals.

On the other hand, when the face plate is removed from the instrument body, the start setting means then places the instrument body in its non-startable state. Therefore, even if the switches in the instrument body are directly manipulated, the instrument body is not started. As a result, the instrument body can be prevented from being stolen.

The start setting means includes a switch having a movable contact which is depressed by the face plate when it is mounted on the instrument body. When this switch is activated, the instrument body can be set at the startable state. The switch is also disposed in the instrument body.

The above switch may be located in a power supply line to a chip enable terminal of a microcomputer. The microcomputer is started when the power is applied to the chip enable terminal through the power supply line and the switch.

The start setting means comprises a voltage dividing circuit having a plurality of resistors. A voltage divided by the voltage dividing circuit may be used to set the instrument body in the startable state. At this point, part of the resistors may be located in the instrument body, the rest in the face plate. When the face plate is mounted on the instrument body, the resistors are connected to one another to form said voltage dividing circuit.

If the instrument body includes a microcomputer having an analog/digital converter and its port, it is preferred that the aforementioned voltage dividing circuit is used. The microcomputer may be started by applying a voltage within an appropriate range to the port through the power supply line. Thus, the voltage dividing circuit is connected with the power supply line leading to the port. If the face plate is mounted on the instrument body, the aforementioned resistors form the voltage dividing circuit so that the voltage within the appropriate range is divided by the voltage dividing circuit and then applied to the port.

In the on-vehicle sound instrument of the present invention, the instrument body may comprise a holder on which said face plate is detachably mounted, said holder having a holder plate located facing the back side of said face plate and a frame portion standing forward from the edge of said holder plate, said frame portion including engaging portions formed therein at the opposite crosswise ends of said holder and wherein said face plate comprises a fixed portion to be engaged with one engaging portion in said holder, a movable portion to be engaged with the other engaging portion in said holder, and a release lever for disengaging the movable portion to be engaged from the other engaging portion in said holder.

When the portions to be engaged are engaged with the respective engaging portions, the face plate is fixed to the holder. When the release lever is activated, the face plate is separated from the holder.

It is preferred that the holder includes a spring for biasing the face plate in the forward direction at all time. When the release lever is activated, the spring enables the face plate to jump out forward while rotating around the engagement point between the engaging portions and the portions to be engaged. This improves the mounting of the face plate on the instrument body.

The start setting means comprises a switch having a movable contact which is adapted to be depressed by the face plate when it is mounted on the instrument body. When the instrument body is to be set at the startable state with a switch, the aforementioned spring may be used in place of the movable contact. This reduces the number of parts to be used.

When the spring is used as a movable contact, the back side of the holder plate may include a first electrode fixedly supporting the spring and a second electrode engageable with and separable from the spring. The holder plate also includes an opening formed therethrough and opened at the back side. The spring may have a projection extending forward from the front side of the holder plate through the opening.

When the face plate is mounted on the holder, the face plate depresses the projection to separate the spring from the second electrode. As a result, the instrument body is set in the startable state.

It is more preferable to provide a plurality of such springs each of which is engageable with and separable from the second electrode. In such an arrangement, the start setting means can start the instrument body only when all the projections are depressed to separate all the springs from the second electrode. On the contrary, the instrument body will not be started only by depressing part of the projections with hand. Therefore, a thief may think that the on-vehicle sound instrument can be started only with the face plate. This contributes to prevent the on-vehicle sound instrument from being stolen.

If a projection of a spring extending outwardly from the holder plate is intentionally or accidentally touched by the user, a high voltage resulting from the static electricity may be applied to the instrument body. It is thus preferable to connect a protection circuit to the power supply line which is connected to the chip enable terminal of the microcomputer. Such a protection circuit prevents the high voltage due to the static electricity from being applied to the chip enable terminal through any one of the projections in the springs.

If the face plate has part of the resistors defining the voltage dividing circuit as described, a plurality of contacts for connecting the opposite ends of such a resistor to the instrument body are provided in the holder. In such a case, the springs provided in the holder to cause the face plate to jump out can be used as contacts.

These springs serving as contacts may respectively be fixed to a plurality of electrodes which are provided on the back side of the holder plate. The holder plate may also include a plurality of openings formed therethrough. Each of the springs may include a projection extending forward from the front side of the holder plate through the corresponding opening.

In such an arrangement, when the face plate is mounted on the holder plate, the resistor in the face plate is brought into contact with the projections at the opposite ends to form a voltage dividing circuit which is in turn used to start the on-vehicle sound instrument.

It is further preferable that the projection or projections extending from the holder plate are offset from the central crosswise position of the holder to the end of the holder which is engaged with the movable portion to be engaged of the face plate. This is because a rotational jumping-out moment applied to the face plate from the spring or springs is increased, when the face plate is removed from the instrument body.

It is still further preferable that the face plate includes a protruding portion located opposite to the frame portion of the holder, the frame portion including a stopper groove formed therein, the stopper groove being adapted to guide and stop the protruding portion at a position where the stopper groove does not reach the opening edge of the frame portion when the face plate is mounted on or dismounted from the instrument body.

The protruding portion in the face plate is engaged with the end face of the stopper groove so that the face plate is prevented from falling from the frame portion.

It is further preferable that the stopper groove is offset from the central crosswise position of the holder to the end of the holder which is engaged with the fixed portion to be engaged of the face plate.

Since the position of the stopper groove is nearer the fulcrum of the face plate on jumping-out, the length of the groove can be reduced. As a result, the standing height of the frame portion in the holder can be reduced.

Preferably, the face plate may comprise a front panel for convenience in assembly and a back lid panel fixedly mounted on the back side of the front panel. The operation keys are held between the front panel and the back lid panel. Each of the operation keys is provided with a shaft which is extended outwardly from the back lid panel to activate the switch when any manipulation is carried out on the front panel. The front and back lid panels include means for biasing the shaft so that the shaft will not accidentally extend outwardly from the back lid panel.

In such an arrangement, the shaft, which is relatively thin, can be prevented from being damaged when the face plate is carried or stored after being removed from the instrument body.

The biasing means is preferably formed of any porous cushion material, rather than leaf spring or coil spring because it can greatly improve the assembly of the face plate.

If the face plate includes a plurality of operation keys arranged in a straight line, the porous cushion member may be formed to have a length corresponding to the width of the operation key array. The assembly of the face plate can be further improved.

The present invention also provides an on-vehicle sound instrument comprising:

an instrument body fixedly mounted on a vehicle;

a portable face plate detachably mounted on said instrument body;

said instrument body having a first connector including a plurality of terminals disposed in array;

said face plate comprising:

a second connector having a plurality of terminals disposed in array each of which is connected to the respective one of said terminals in said first connector;

a plurality of operation keys for activating said instrument body in various operational modes;

a plurality of switches each of which is activated by the corresponding one of said operation keys; and a circuit board on which said switches are mounted, said circuit board connecting said switches and said second connector;

said on-vehicle sound instrument further comprising start setting means for placing said instrument body in a startable state only when said terminals of said first and second connectors are connected to one another at the opposite ends in the direction of the arrays.

According to the present invention, the terminals of the first connector in the instrument body are connected to the terminals of the second connector in the face plate so as to place the on-vehicle sound instrument in an usable state. At this point, the start setting means can place the instrument body in the startable state only when the terminals of said first and second connectors are connected to one another at the opposite ends in the direction of the arrays. When the instrument body is in the startable state, all the terminals other than those at the opposite ends of the terminals are connected to one another at all time.

Where the face plate includes a liquid-crystal display driven by drive signals from the instrument body, the first and the second connectors include liquid-crystal drive terminals disposed between the opposite ends in the direction of the arrays. Thus, the liquid-crystal display is not disturbed immediately after the power is ON in the instrument body.

The instrument body further comprises a microcomputer having a chip enable terminal. The start setting means may be formed to supply the power to the chip enable terminal of the microcomputer only when the terminals of the first and the second connectors are in contact with one another at the opposite ends. The microcomputer is started when the power is supplied to the chip enable terminal through the power supply line.

The instrument body may have a holder detachable from the face plate, the holder including an engaging portion at one end in a direction parallel to that of the terminal array.

The face plate may include a portion to be engaged formed therein at one end in a direction parallel to that of the terminal array, the portion to be engaged being engaged with the engaging portion. When the face plate is rotated around a point at which the engaging portion and the portion to be engaged are engaged with each other, the face plate can be mounted on or dismounted from the instrument body.

Although the terminals in the connectors are sequentially connected to one another starting from one end of the arrays, any failure can be avoided since the instrument body is not started until the terminals of the connectors are connected to each other at the opposite ends.

BRIEF DESCRIPTION OF THE DRAWINGS

FIG. 1 is a schematic and perspective view of an on-vehicle sound instrument constructed in accordance with the first embodiment of the present invention with a face plate removed from the instrument body.

FIG. 18 is a schematic view illustrating the mounting and dismounting of the face plate on the instrument body.

BEST FORMS FOR CARRYING OUT THE INVENTION

Figure 2:
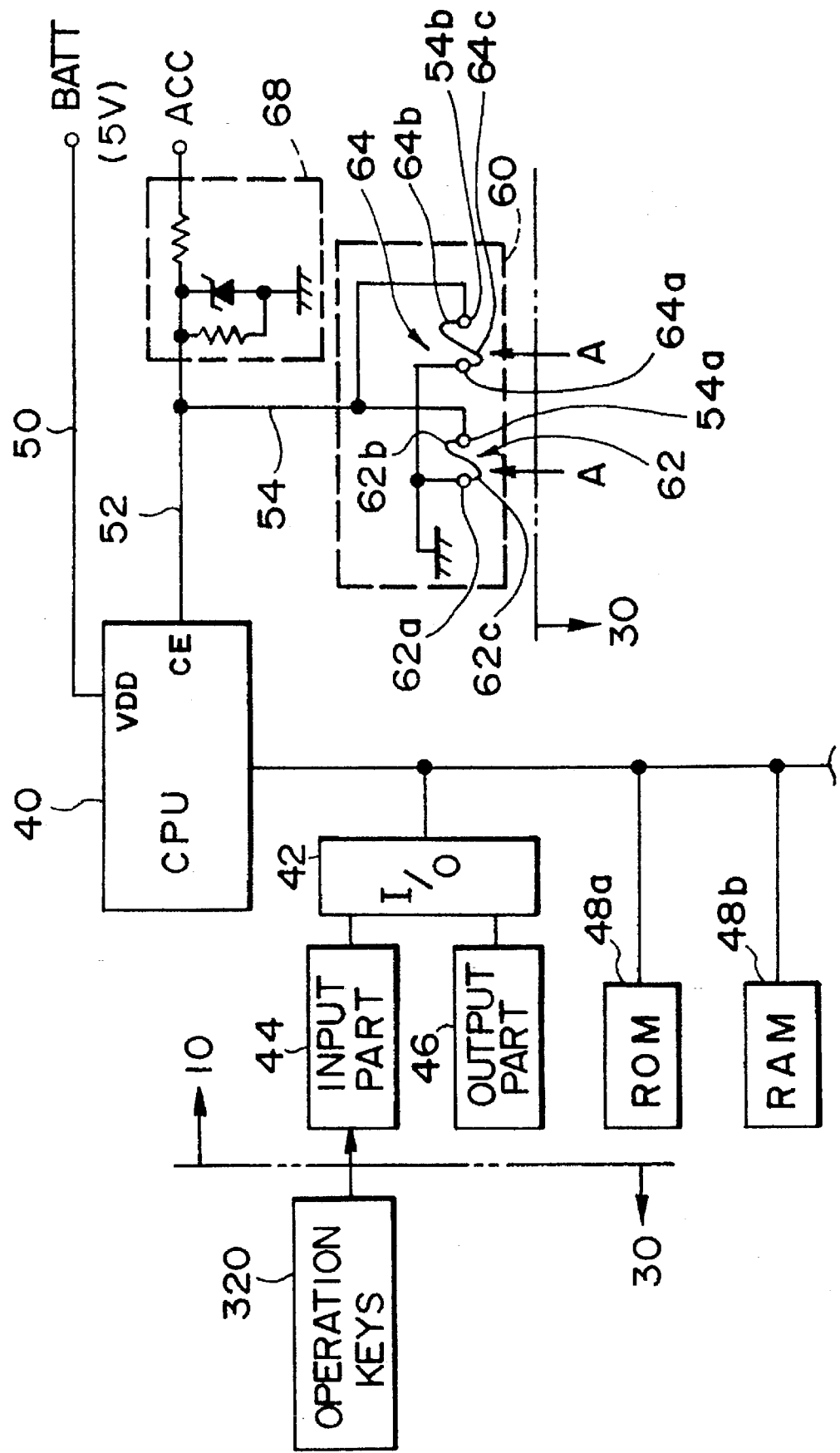
FIG. 2 is a block diagram of the control system shown in FIG. 1, including the start setting means.

One embodiment of the present invention in which the on-vehicle sound instrument thereof is applied to a car radio including a cassette player is described in detail with reference to the drawings.

<First Embodiment>
General Layout of On-Vehicle Sound Instrument

As shown in FIG. 1, the car radio generally comprises an instrument body 10 fixedly mounted on a vehicle and a portable face plate 30 detachably mounted on the instrument body 10. The instrument body 10 includes a holder 20 fixedly mounted thereon at the front face, on which the face plate 30 is detachably mounted. The holder 20 comprises a holder plate 200 located opposite to the back side of the face plate 30 and a square-shaped frame portion 202 standing from the holder plate 200 at the edge portion thereof in the forward position relative to the holder plate 200.

Figure 5:
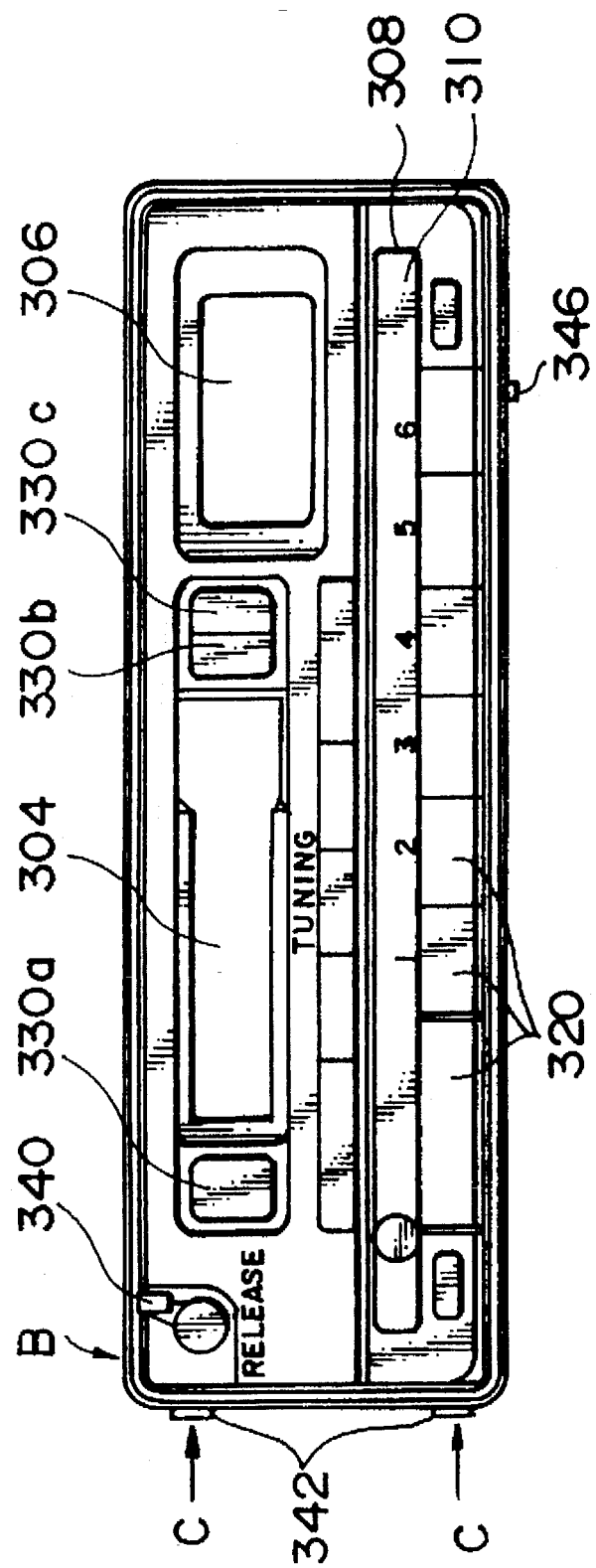
FIG. 5 is a front view of the face plate shown in FIG. 1.

The face plate 30 does not have any electronic/electric parts for driving the radio and cassette player sections, any circuit board therefor and any light source for indicating or confirming the operations. As shown in FIGS. 1 and 5, the face plate includes a cassette insertion window 304, a liquid-crystal display window 306 and a light projection window 308. The face plate 30 also includes input operation keys 320 for outputting and adjusting sound signals, operation keys 330a–330c usable for activating the cassette player and a release lever 340. The light projection window 308 incorporates a first light guide 310 on which function names of the various operation keys 320 are printed.

Figure 9:
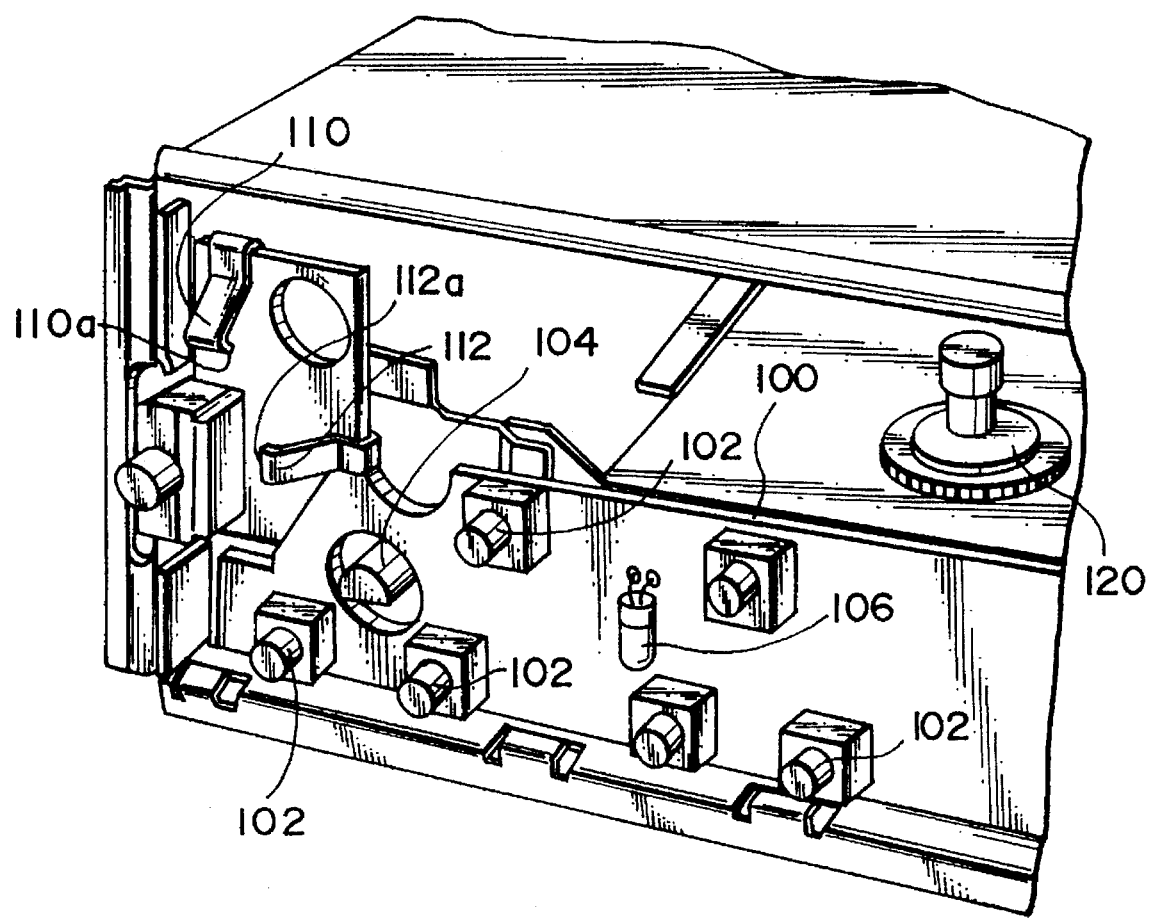
FIG. 9 is a schematic and perspective view of the front side of the instrument body from a holder shown in FIG. 1.

On the other hand, as shown in FIG. 9, the front face of the instrument body 10 includes a vertically standing circuit board 100 located opposite to the face plate 30. The circuit board 100 includes various switches 102 activated by the operation keys 320 on the face plate 30, respectively. These switches 102 can be used for applying the power to the instrument body 10, the choice of preset and tuned frequencies, the switching between local and distance, the choice of bands, the input to various electronic tuning, note, tone and balance volumes and so on. If a variable resistor is used in place of these electric volumes, the on-vehicle sound instrument may comprise a volume shaft 104 extending outwardly from the front side of the circuit board 100, as shown in FIG. 9. The volume shaft 104 can be rotated directly by the operation keys 320 on the face plate 30.

The circuit board 100 also includes a light source lamp 106 which is adapted to project a light onto the first light guide 310 of the face plate 30 through a light guide which is described later.

Figure 11:
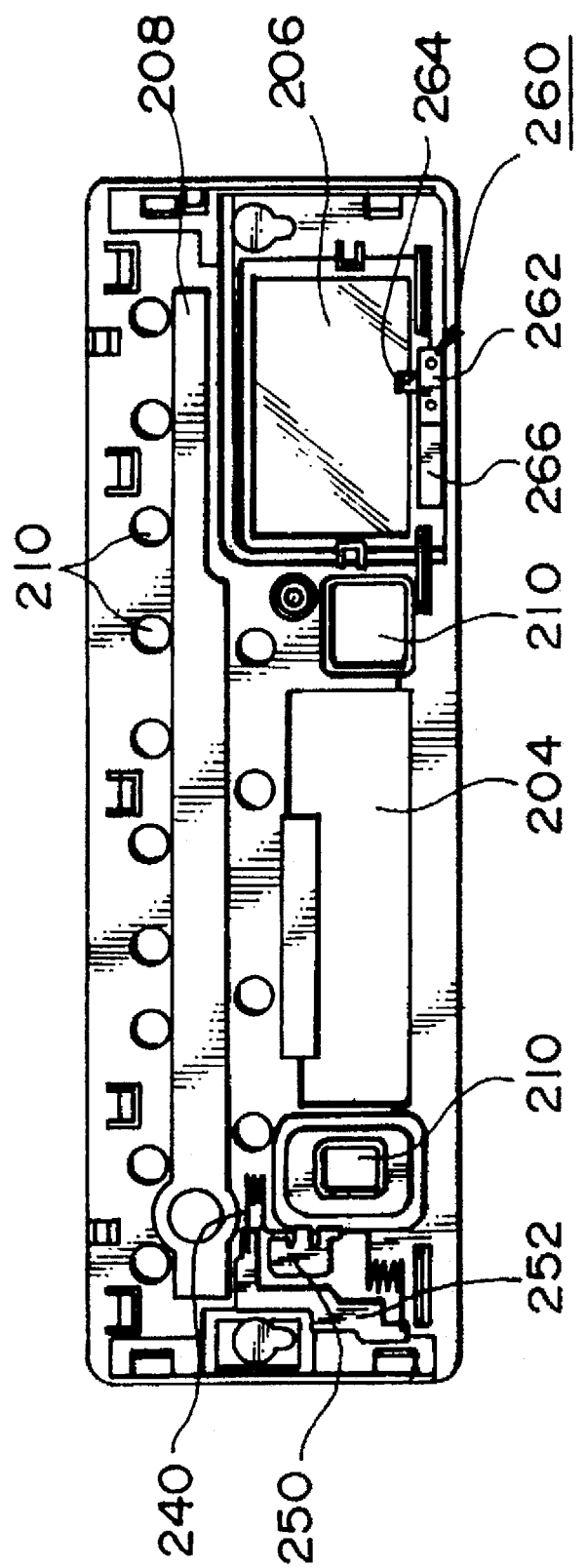
FIG. 11 is a back view of the holder shown in FIG. 11.
Figure 15:
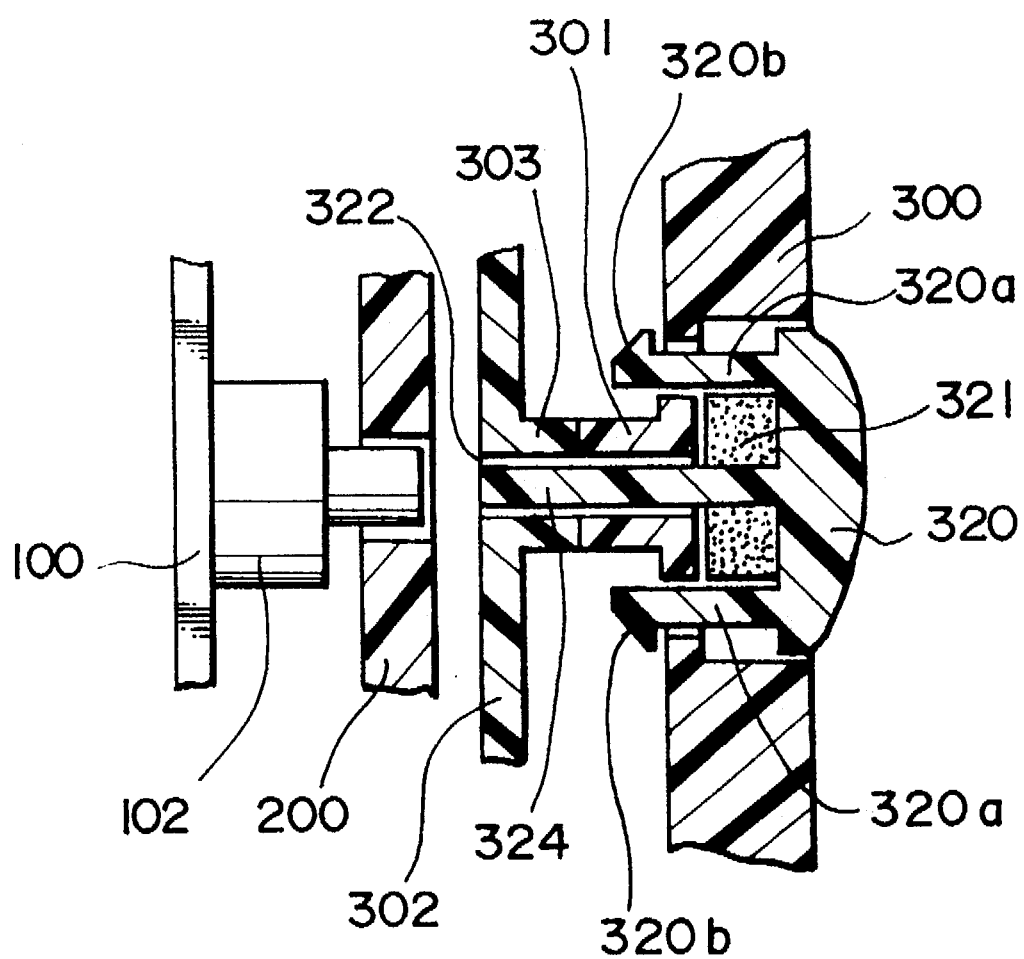
FIG. 15 is a schematic cross-section of the switch holding structure in the face plate.

As shown in FIGS. 1, 11 and 15, the holder 20 includes a number of holes 210 formed therein at positions opposite to the respective switches 102 on the circuit board 100 of the instrument body 10. When each of the operation keys 320 on the face plate 30 is manipulated, the corresponding shaft 324 extending from the back side of the face plate 30 can be moved to depress the corresponding switch 102 through the corresponding hole 210.

Control System including Start Setting Means

The car radio according to this embodiment can be prevented from theft when the face plate 30 is removed and carried away from the instrument body 10. If the switches 102 on the instrument body 10 are manipulated directly by any thin rod-like member through the holes 210 formed in the holder 20, however, the car radio cannot effectively be prevented from theft. Therefore, this embodiment provides start setting means for placing the instrument body 10 in the startable state only when the face plate 30 is on the instrument body 10. The instrument body 10 includes projections 62c and 64c extending outwardly from the holder plate 200 of the holder 20 for detecting the face plate 30 mounted on the instrument body 10. When these projections 62c and 64c are depressed, the start setting means is activated. Such a control system is described with reference to FIGS. 2–4.

As shown in FIG. 2, there is a CPU 40 for controlling the car radio formed of, for example, a microcomputer. The CPU has a bus line connected to input and output parts 44, 46 through an input/output interface 42. The input part 44 includes the switches 102 activated by the operation keys 320 on the face plate 30. The output part 46 includes a circuit unit for performing a series of operations through which signals input through an antenna are detected, tuned and output toward a loud speaker as well as the electronic tuning and other volumes. The bus line of the CPU 40 is connected to a storage unit consisting of ROM 48a and RAM 48b. RAM 48b stores various data set and input through the operation keys 320 on the face plate 30, such as data used to select preset and tuned frequencies, tune, sound, tone and balance volumes, bands and local/distance.

The CPU 40 has a power input terminal VDD to which a voltage of five volts is constantly applied through a battery supply line 50 connected to an on-vehicle battery. To start the CPU 40, it is required to apply, for example, a voltage of five volts to the chip enable terminal CE thereof. The chip enable terminal CE is connected to an accessory (ACC) power supply line 52 which may be connected to an earth line 54. In this embodiment, therefore, the start setting means 60 comprises switches which disconnect the earth line 54 in response to mounting and dismounting of the face plate 30.

The start setting means 60 comprises first and second switches 62, 64 which are connected parallel to the earth line 54. More particularly, the first and the second switches 62, 64 include fixed contacts 62a and 64a connected to the earth. The switches 62, 64 further include movable contacts 62b and 64b which are connected with or disconnected from the corresponding fixed contacts 54a and 54b leading to the accessory power supply line 52. When the face plate 30 is mounted on the holder 20, the projections 62c and 64c shown in FIGS. 1 and 2 are depressed to separate the movable contacts 62b and 64b of the first and second switches 62 and 64 from the fixed contacts 54a and 54b. Thus, the first and the second switches are deactivated.

In such a condition as shown in FIG. 2, the face plate 30 is separated from the holder 20. Since the accessory power supply line 52 is in ground potential at this point, the desired voltage is not applied to the chip enable terminal CE of the CPU 40. Therefore, the CPU 40 is not started. When the face plate 30 is mounted on the holder 20, the first and the second switches 62 and 64 are deactivated by an external force as shown by arrow A in FIG. 2. Thus, the desired voltage is applied to the chip enable terminal CE of the CPU 40 through the accessory power supply line 52, placing the CPU 40 in the startable state.

In the embodiment as shown in FIG. 2, a protection circuit 68 comprising resistors and a Zener diode is interposed between the chip enable terminal CE and the ACC, and is connected to the accessory power supply line 52. The protection circuit 68 serves to protect the CPU 40 from static electricity. In other words, when the face plate 30 is removed from the instrument body 10 and the user accidentally touches the projections 62C and 64C extending from the holder plate 200 of the holder 20, a high voltage due to static electricity may be applied directly to the chip enable terminal CE of the CPU 40. Thus, the protection circuit 68 prevents the high voltage due to static electricity from being applied to the CPU 40.

Figure 3:
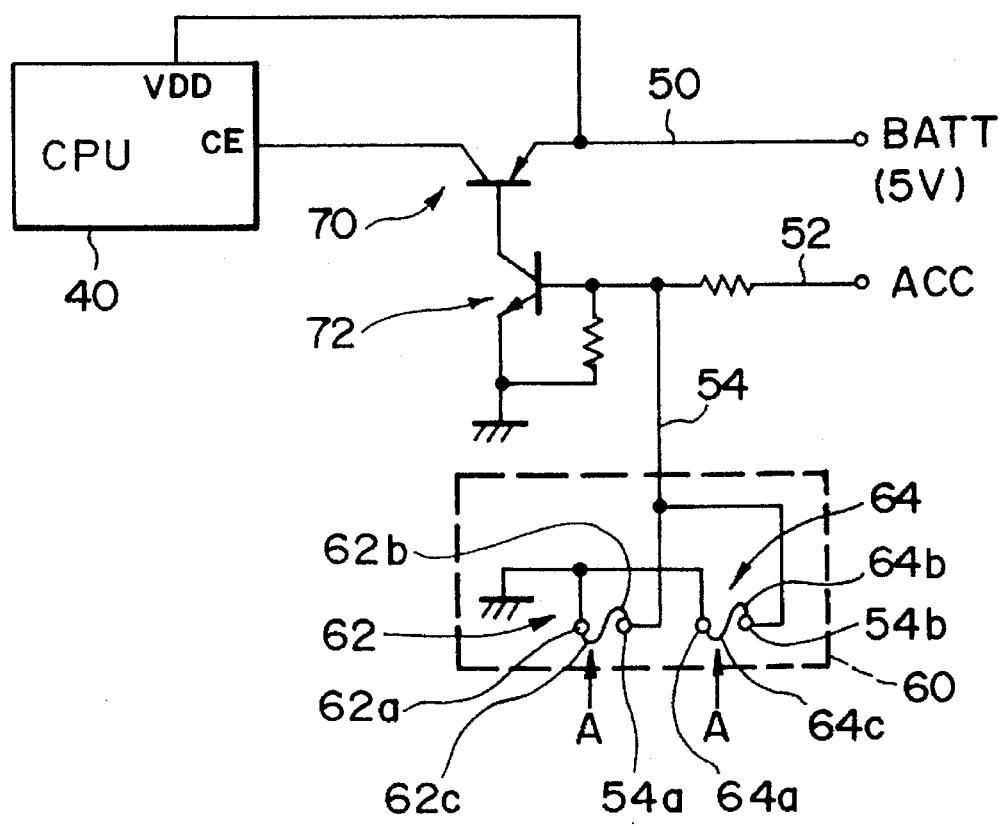
FIG. 3 is a circuit diagram illustrating another connection of the start setting means shown in FIG. 2.

FIG. 3 shows another embodiment of the present invention. This start setting means 60 is of the same configuration as that of FIG. 2, but different from that of FIG. 2 in the arrangement of the power supply line to the chip enable terminal CE of the CPU 40. In the arrangement of FIG. 3, the battery supply line 50 is connected to the chip enable terminal CE while a first PNP type transistor 70 is connected to the line 50. The first transistor 70 may be turned on when its base potential is low. To turn the first transistor 70 on and off, there may be provided, for example, a second NPN type transistor 72 which is turned on when its base potential is high. The base of the transistor 72 is connected to the accessory power supply line 52 which is in turn connected to the earth line 54. The start setting means 60 shown in FIG. 3 may be connected and disconnected to the earth line 54 in the same manner as in FIG. 2 with mounting and dismounting of the face plate 30 on the instrument body 10.

Such a condition as shown in FIG. 3 shows the face plate 10 removed from the instrument body 10 wherein the first and the second switches 62 and 64 in the earth line 54 are in the ON state. Therefore, the base potential in the second transistor 72 is low. As a result, neither the second transistor 72 nor the first transistor 70 is turned on. The CPU 40 is in a non-startable state since the predetermined voltage is not applied to the chip enable terminal CE thereof.

On the other hand, when the face plate 30 is mounted on the instrument body 10, the external force as shown by arrow A in FIG. 2 deactivates the first and second switches 62 and 64. The second transistor 72 is turned on due to its high base potential while the first transistor 70 is also turned on due to its low base potential, thus setting the CPU 40 in a startable state.

Figure 4:
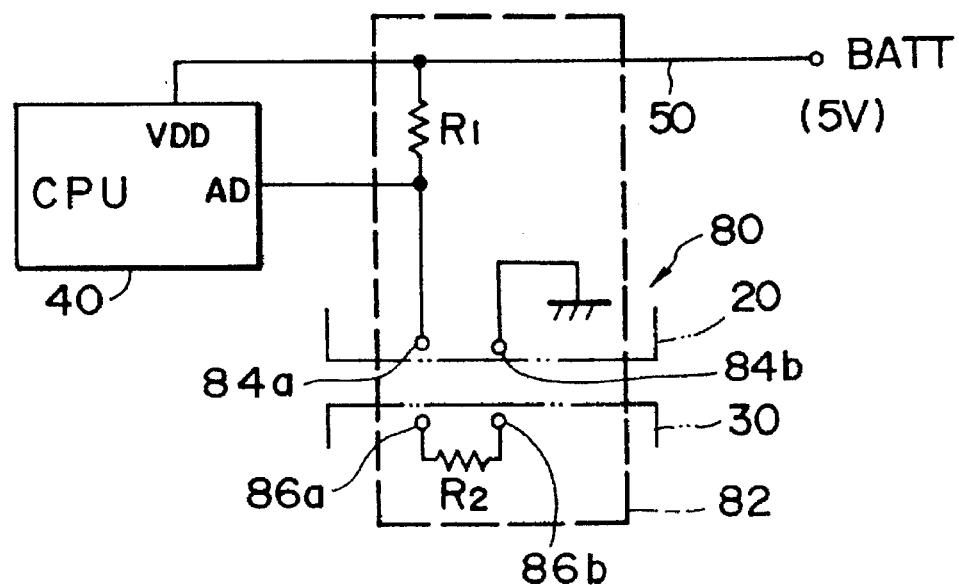
FIG. 4 is a circuit diagram of a modification of start setting means.

FIG. 4 shows still another embodiment of the present invention. CPU 40 including an analog/digital converter requires an appropriate voltage whose threshold value falls within the range of the upper and lower limits is applied to the port of the analog/digital converter (hereinafter referred to "AD port"). In the embodiment of FIG. 4, the voltage of five volts applied through the battery supply line 50 is divided by a voltage dividing circuit 82 which comprises resistors R1 and R2 to form a desired voltage, that is, 5 V×R1/(R1+R2). FIG. 4 also shows start setting means 82 adapted to disconnect and connect the voltage dividing circuit 82 with mounting and dismounting of the face plate 30 on the instrument body 10. For such a purpose, the holder 20 includes a contact 84a connected to the AD port and another contact 84b set in ground potential. On the other hand, the face plate 30 includes the resistor R2 located therein, the opposite ends of this resistor R2 being connected to terminals 86a and 86b. The holder 20 includes two contacts 84a and 84b which may be formed by the two projections 62c and 64c shown in FIG. 1.

When the face plate 30 is removed from the instrument body 10 in the embodiment of FIG. 4, the voltage of five volts is applied to the AD port of the CPU 40 through the battery supply line 50. Thus, the CPU 40 is in a non-startable state. On the other hand, when the face plate 30 is mounted on the instrument body 10, the voltage dividing circuit 82 is formed to apply an appropriate divided voltage to the AD port of the CPU 40. Thus, the CPU 40 is set in the startable state.

In the respective embodiments of FIGS. 2–4, the instrument body 10 can be started only when the two projections 62c and 64c shown in FIG. 1 are simultaneously depressed. Even if a thief moves either of the projection 62c or 64c downward when the power switch is ON, the instrument body 10 does not start. Therefore, the instrument body 10 can be prevented effectively from theft. Even though the two projections 62c and 64c are depressed at the same time in the embodiment of FIG. 4, the instrument body 10 can be started only when the resistor R2 is connected to the instrument body 10. The possibility that the instrument body 10 is accidentally started by the thief may be reduced to a sufficient degree.

The start setting means does not necessarily have to place the CPU 40 in the startable state as long as such means starts the instrument body 10 only when the face plate 30 is mounted thereon. For example, the signal line of the power switch may be controlled such that the instrument body 10 is not powered on even if the power switch is manipulated.

The details of the instrument body 10, holder 20 and face plate 30 will now be described with reference to FIGS. 1 and 5–15.

Mounting of Operation Keys 320

Figure 6:
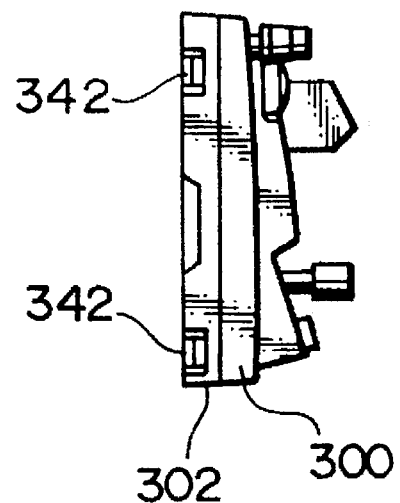
FIG. 6 is a left side view of the face plate shown in FIG. 5.
Figure 7:
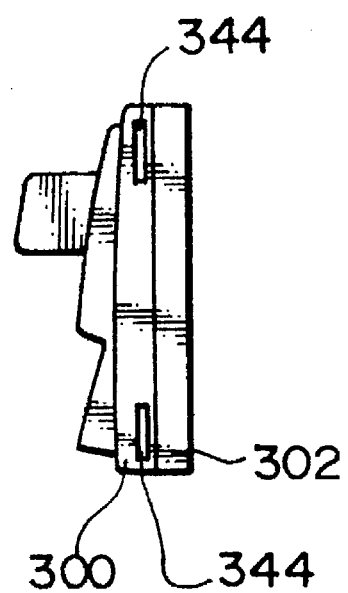
FIG. 7 is a right side view of the face plate shown in FIG. 5.
Figure 8:
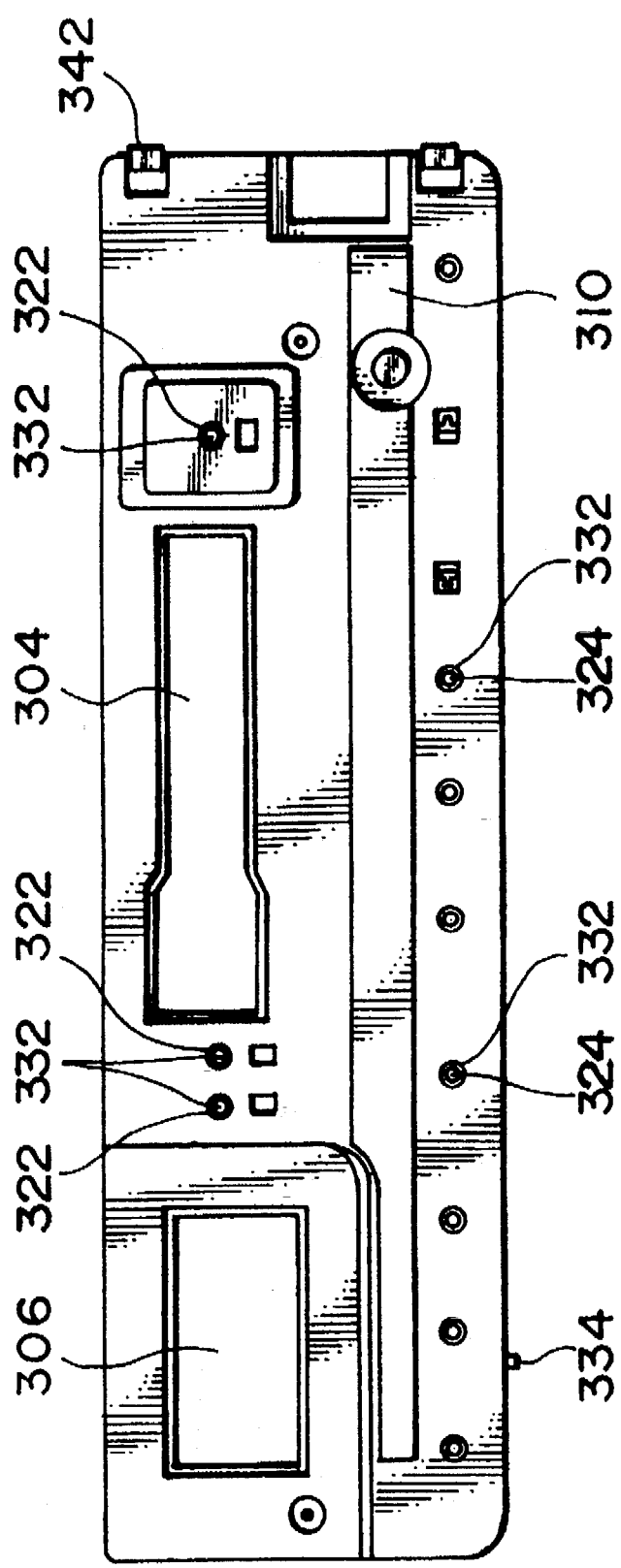
FIG. 8 is a back side view of the face plate shown in FIG. 5.

As shown in FIGS. 1, 6 and 7, the face plate 30 is of such a structure that the front and the back panels 300, 302 are overlaid with each other. The operation keys 320 are held between the front and the back panels 300, 320. The holding structure of the operation keys 320 is described below with reference to FIG. 15.

As shown in FIG. 15, each of the operation keys 320 includes two spring-like legs 320a and a stem 324, all of which are formed at the back side of the operation key. The operation key 320 can be inserted into an operation key receiving aperture in the front side of the face plate 30 by resiliently deforming the legs 320a so as to narrow the distance between them. Thereafter, the legs 320a rebounds to their original forms and stoppers 320b formed at the ends of the legs face the inner wall of the front panel 300 so that the operation key 320 is held against the face plate 30.

The front and the back panels 300, 302 respectively include guides 301 and 303 for guiding the stem 324 of the operation key 320 when the stem 324 is mounted on the face plate 30.

When the operation key 320 is depressed, the stem 324 is extended outwardly from the back lid panel 302 to engage and activate the corresponding switch 102 on the instrument body 10. To return the depressed operation key 320 to its original position, a return spring contained in the switch 320 can be used when the face plate is mounted on the instrument body 10. It is, however, desirable that when the face plate 30 is dismounted from the instrument body 10, the operation key 320 is set to its original position. This is because if the stem 324 remains in its extended position when the face plate 30 is carried, the stem 324 may be damaged easily.

In this embodiment, a member 321 for returning the operation key 320 to its original position is located between the back side of the operation key 320 and the end face of the guide 301 opposite to it. The member 321 may be in the form of a coil spring or leaf spring. Considering the assembly, however, it is preferred that the member 321 (called "sponge 321" hereinafter) is formed of a porous and resilient cushion material such as sponge. The sponge 321 biases the operation key 320 outwardly so that the stem 324 of the operation key 320 is always maintained flush with or retracted inwardly from the outside of the back lid panel 302.

The operation key 320 may be assembled into the face plate 30 simply by first locating the sponge 321 on the end face of the guide 301 after the front and back panels 300, 302 have been fixed, and then inserting the operation key 320 into the aperture from the front panel 300 in the aforementioned manner.

Where a plurality of such operation keys 320 are arranged in a transverse line as shown in FIG. 5, a single elongated sponge 321 may be located over the area on which the operation keys 320 are disposed so that they can return to their original positions. Such an arrangement reduces the number of parts and further improves the assembly. The cushion material 321 is not necessarily perforated for receiving the stems 324, because the stems 324 can be penetrated easily through the cushion material 321. This reduces the parts cost.

If the sponge 321 is blackened, for example, any light may be blocked through the guide apertures which receive the operation keys 320.

The car radio of this embodiment includes a cassette player 120 as shown in FIG. 9. Thus, the face plate 30 further includes an ejection key 330a, an FF key 330b and an REW key 330c. Although these function keys are mechanically or electrically activated depending on the type of the cassette player 120, each of the functional keys 330a–330c can be activated and extend the stem 332 of the corresponding operation key in any event. Therefore, the functional key 330a–330c may also be of the same structure as that of the other operation keys 320.

The face plate 30 includes only the operation keys 320 and 330a–330c and a release lever 340 which is described later. Therefore, the face plate 30 is improved in portability. All the other necessary parts are mounted in the holder 20 or instrument body 10.

Figure 10:
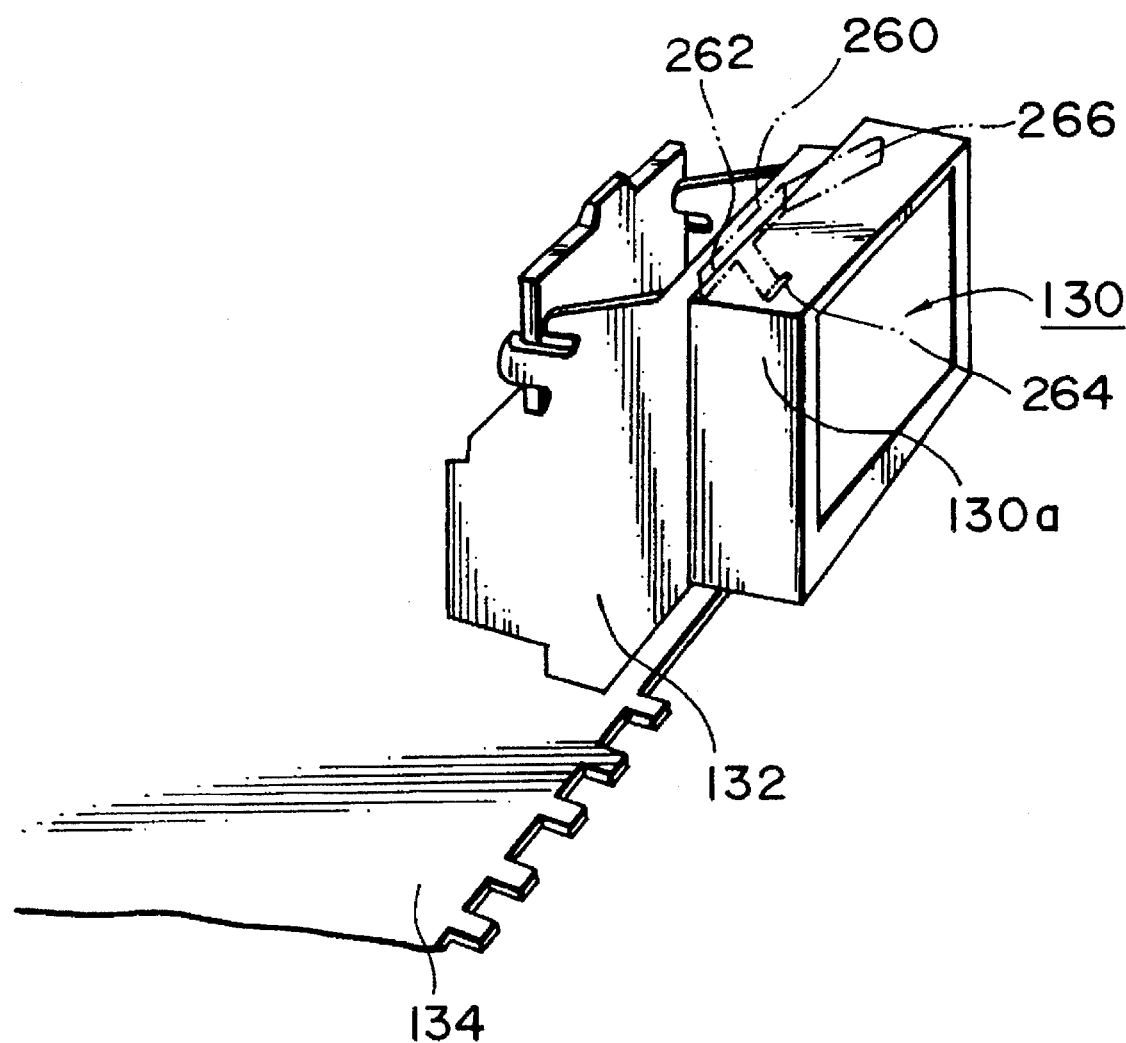
FIG. 10 is a schematic and perspective view of a liquid-crystal unit disposed in the instrument body shown in FIG. 1.

For example, a dust cover 204 for opening and closing the cassette insertion window 304 in the face plate 30 is supported on the back side of the holder 20, as shown in FIG. 11. If the dust cover 204 is mounted on the face plate 30, the dust cover 204 may be damaged when the face plate 30 is carried or the user may be injured by a spring used to close the dust cover. A transparent plate 206 covering the liquid-crystal display window 306 in the face plate 30 is also mounted on the back side of the holder 20, as shown in FIG. 10. If the transparent plate 206 is mounted on the face plate 30, it may be damaged when the face plate 30 is carried. To improve the portability of the face plate 30, a first light guide 310 is formed to be flush with the outside of the back lid panel 302. Such an arrangement cannot sufficiently cause the first light guide 310 to access to the lamp 106 which is mounted on the circuit board 100 of the instrument body 10. To overcome this problem, this embodiment includes a second light guide 208 fixedly mounted on the holder 20 and adapted to perform an efficient light transmission between the lamp 106 of the circuit board 100 and the first light guide 310 of the face plate 30.

Mounting and Dismounting of Face Plate 30

As shown in FIG. 1, the face plate 30 must maintain the two projections 62c and 64c at their depressed positions by placing it within the square frame portion 202 of the holder 20 and also engaging the face plate 30 with the holder plate 200. For such a purpose, the face plate 30 may include two first pawls 342 serving as movable engaged portions formed in the left side thereof, and two engagement apertures 344 serving as fixed engaged portions formed in the right side of the face plate 30. The first movable pawls 342 can be extended from or retracted into the left side of the face plate 30 by the use of the release lever 340 in the face plate 30. More particularly, the first pawls 340 are biased outwardly to extend from the left side of the face plate 30. When the release lever 340 is rotated in a direction as shown by arrow B in FIG. 5, the first pawls 340 can be moved in a direction as shown by arrow C in FIG. 5.

Figure 13:
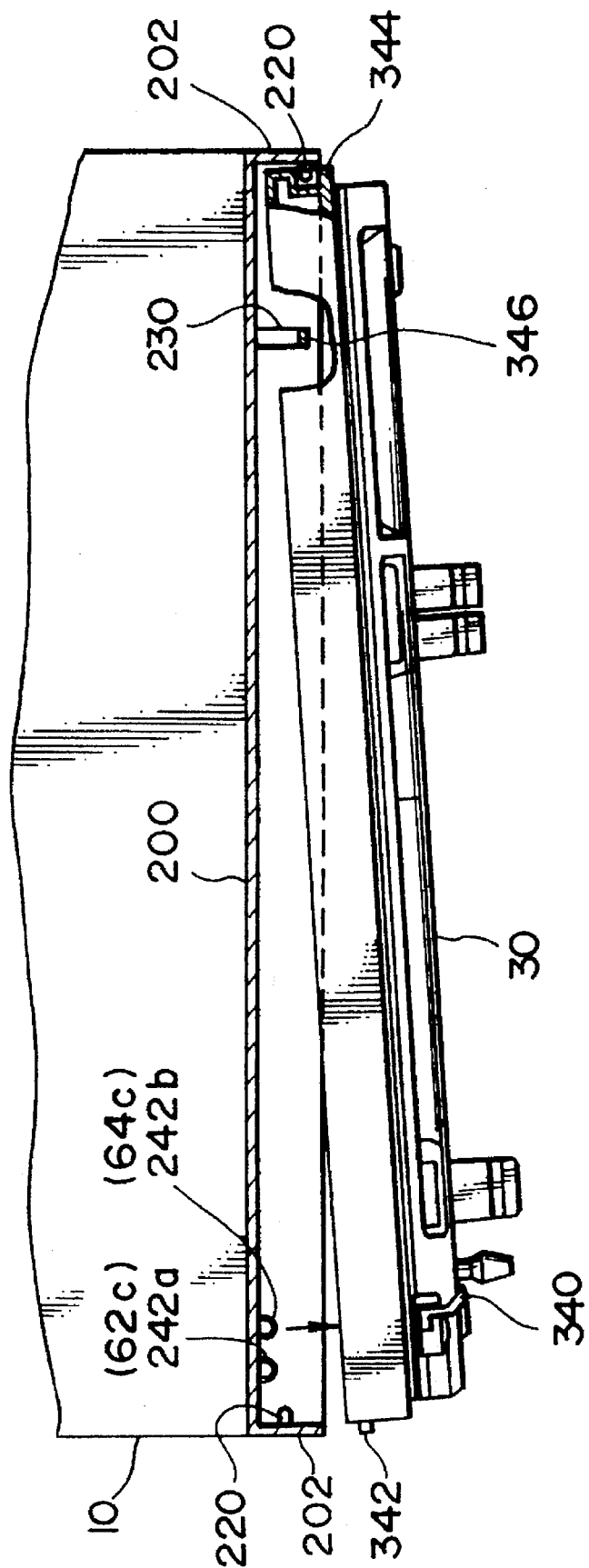
FIG. 13 is a schematic and perspective view illustrating the mounting and dismounting of the face plate on the holder.

On the other hand, the frame portion 202 of the holder 20 includes two second pawls 220 extending inwardly from the opposite inner sides thereof, and a space apart from each other in the vertical direction (see FIGS. 1 and 13).

FIG. 13 shows the face plate 30 at its initial state when it is being mounted on or being dismounted from the instrument body 10. The mounting of the face plate 30 will be described first. As shown in FIG. 13, the face plate 30 is inserted into the holder 20 obliquely from the front, with the second pawls 220 in the right inner side of the holder 20 being then inserted into the engagement apertures 344 in the right side of the face plate 30. Thereafter, the face plate 30 is rotated while maintaining the engagement between the apertures 344 and the second pawls 220. At this point, the release lever 340 is rotated in the direction as shown by arrow B in FIG. 5 so as to prevent the first pawls 342 on the left side of the face plate 30 from interfering with the second pawls 220 in the right side of the frame portion 202. After the back side of the face plate 30 has been engaged with the holder plate 200 of the holder 20, the release lever 340 is released. Thus, the second pawls 220 in the left side of the holder 20 are engaged with the first pawls 342 in the face plate 30, respectively. In such a manner, the face plate 30 can maintain a mounted state on the instrument body 10.

When the face plate 30 is to be removed from the holder 20, the release lever 340 may simply be rotated in the direction as shown by arrow B in FIG. 5. The two projections 242a and 242b is extended forward from the holder plate 200 with its own resilience. When the release lever 340 is activated, the apertures 344 in the right side of the face plate 30 are in engagement with the second pawls 220 in the holder 220. Therefore, the face plate 30 is rotated around the engagement point. Since the two projections 242a (62c) and 242b (64c) for applying the jumping-out force to the face plate 30 are offset from the above engagement point, a rotational moment acting on the face plate 30 is increased so that the left side portion of face plate 30 can positively be jumped out from the frame portion. The projections 242a and 242b also function as contacts on the instrument body 10 in the respective embodiments shown in FIGS. 2–4. Therefore, the number of necessary parts can be reduced.

Figure 14:
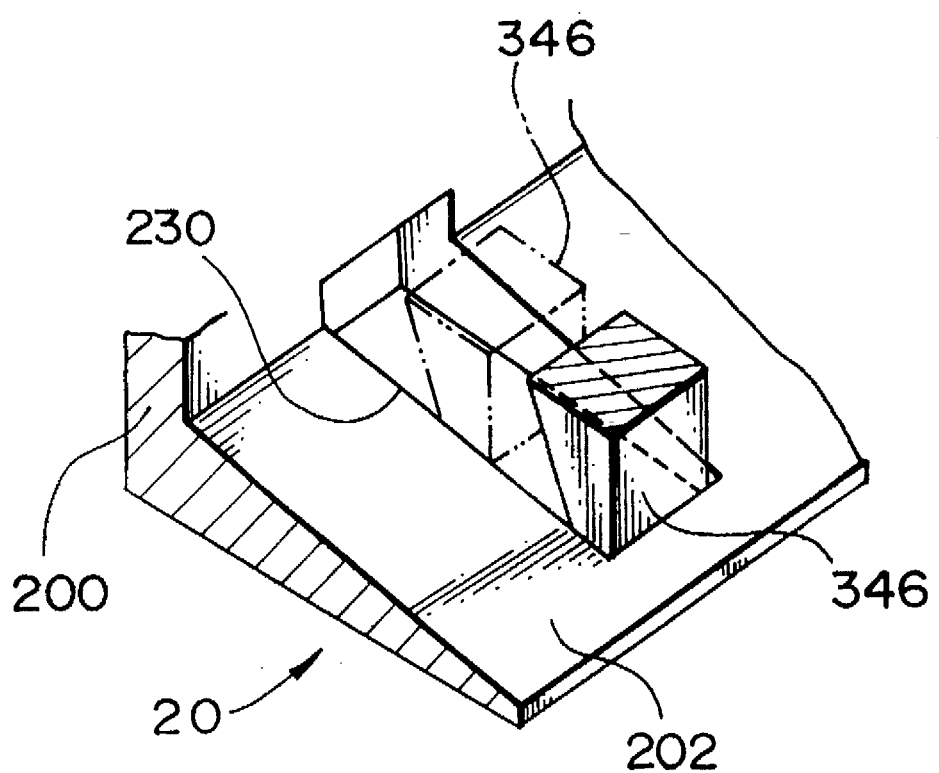
FIG. 14 is a schematic and perspective view of a structure for preventing the face plate from falling.

This embodiment further includes means for maintaining the face plate 30 at such a state as shown in FIG. 13 without the user's support. As shown in FIGS. 5, 13 and 14, the underside of the face plate 30 includes a protrusion 346 formed therein to extend downward. On the other hand, a stopper groove 230 is formed in the lower side of the frame portion 202 of the holder 20 so as to guide and limit the movement of the protrusion 346 to a position at which the protrusion 346 does not reach the opening edge of the frame portion 202, when the face plate 30 is mounted on or dismounted from the instrument body 10. The relationship between the protrusion 346 and the stopper groove 230 is more clearly shown in FIG. 14.

Such a condition as shown by a phantom line in FIG. 14 shows the face plate 30 being mounted on or dismounted from the instrument body 10, while being rotated around its right side. Such a condition as shown by a solid line in FIG. 14 indicates the face plate 30 being maintained at its jumped-out position from the holder 20 illustrated in FIG. 13. At this point, the movement of the protrusion 346 in the face plate 30 is limited by engaging the protrusion 346 with the step on the opening edge of the stopper groove 230. Even during mounting or dismounting rotation or under the jumped-out state as shown in FIG. 13, the face plate 30 can reliably be prevented from falling from the holder 20, since the engagement apertures 344 and protrusion 346 are always engaged with the holder 20. The underside of the frame portion 202 is also formed with a slope guide 232 for guiding the face plate 30 in the oblique and upward direction as the face plate 30 is being moved to the holder plate 200. The lower slope guide 232 co-operates with the upper frame side 202 to position the face plate 30 at its proper vertical position.

Contact Structure of Start Setting Means

FIG. 11 shows a contact structure defining the start setting means 60 in the embodiments of FIGS. 2 and 3, the contact structure being located on the back side of the holder 20. Such a contact structure is also clearly shown in FIG. 12.

Figure 12:
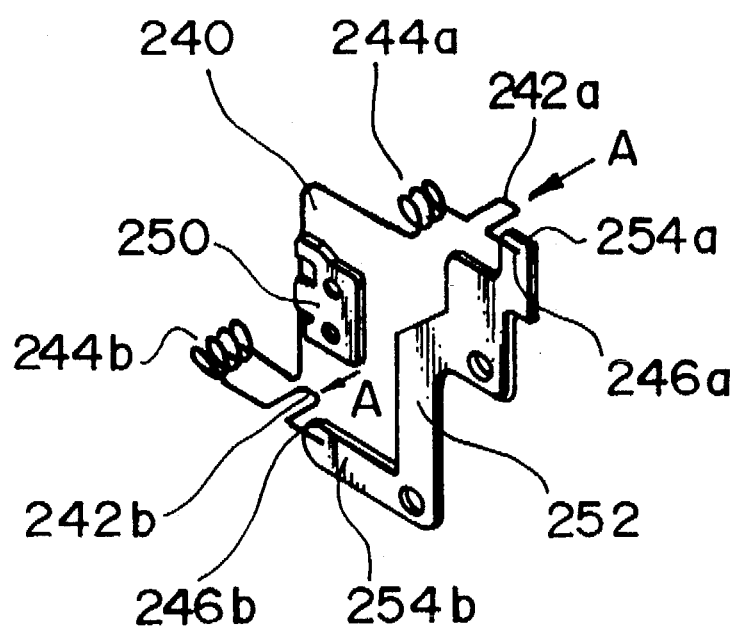
FIG. 12 is a schematic and perspective view of a contact structure disposed on the back side of the holder shown in FIG. 11.

Referring to FIGS. 11 and 12, the back side of the holder 20 includes a jumping-out spring 240 formed of a single wire-like spring material. The jumping-out spring 240 has its opposite ends in which the projections 242a and 242b extending from the holder plate 200 are formed. To increase the resilient deformation in the projections 242a and 242b, the spring 240 includes coil-shaped windings 244a and 244b each of which is formed near the corresponding projection.

The opposite ends of the jumping-out spring 240 function as movable contacts 246a and 246b.

The intermediate portion of the jumping-out spring 240 is supported on the backside of the holder plate 200 of the holder 20 through a first electrode plate 250. On the other hand, the holder plate 200 also supports at its backside a second electrode plate 252 which has contacts 254a and 254b formed opposite to the movable contacts 246a and 246b of the jumping-out spring 240, respectively. The movable contacts 246a and 246b are brought into contact with the respective contacts 254a and 254b of the second electrode plate 252 under the resilient force applied from the windings 244a and 244b. When the face plate 30 is mounted on the holder 20, an external force shown by arrow A in FIG. 12 is exerted to the movable contacts 246a and 246b which are in turn separated from the respective contacts 254a and 254b of the second electrode plate 252.

The contact structure of FIG. 12 thus formed is described in comparison with the embodiments of FIGS. 2 and 3. The first electrode plate 250 corresponds to the fixed contacts 62a and 64a connected to the earth. The movable contacts 246a and 246b correspond to the movable contacts 62b and 64b shown in FIGS. 2 and 3. The contacts 254a and 254b of the second electrode plate 252 shown in FIG. 12 correspond to the fixed contacts 54a and 54b in the embodiments of FIGS. 2 and 3.

FIG. 9 shows that the first and the second electrode plates 250 and 252 in the holder 20 are connected to the instrument body 10. As shown in FIG. 9, the circuit board 100 includes first and second leaf springs 110 and 112 extending outwardly therefrom. Since the holder 20 is fixed to the instrument body 10, a contact 110a in the first leaf spring 110 is always in contact with the first electrode plate 250, while a contact 112a in the second leaf spring 112 is always in contact with the second electrode plate 252, for example. When the first leaf spring 110 is connected to the earth and the second leaf spring 112 is connected to the accessory power supply line 52, therefore, the same start setting means 60 as in the embodiments of FIGS. 2 and 3 can be formed.

If it is desired to apply the embodiment of FIG. 4, the contacts 84a and 84b of the holder 20 may be formed of a resiliently deformable contact material as in the above embodiments. Thus, a desired contact pressure can be provided to two terminals 86a and 86b in the face plate 30. Further, the contacts 84a and 84b also function as springs for applying the jumping-out force to the face plate 30 when it is dismounted from the instrument body 10.

Measure Against Static Electricity in Liquid-Crystal Unit

A liquid-crystal unit 130 is disposed in the instrument body 10 at a position opposite to the liquid-crystal display window 306 in the face plate 30. To improve the user's vision, frequently the liquid-crystal display window 306 is formed at the upper half of the face plate 30. On the other hand, as shown in FIG. 10, the liquid-crystal unit 130 is fixedly disposed on a main substrate 134 parallel to a bottom chassis in the instrument body 10, considering the space occupied by the liquid-crystal unit 130. A plastic holder 132 is used to mount and support the liquid-crystal unit 130 at a position above the main substrate 134.

It is to be understood that the liquid-crystal unit 130 may be broken by a static electricity produced when the transparent plate 206 of the holder 20 is touched by the user. To prevent the production of static electricity, it is required to connect a metal chassis 130a to the ground potential. To meet such a requirement, this embodiment includes a leaf spring 260 disposed on the back side of the holder 20. The leaf spring 260 is fixed by welding for example at its fixed portion 262, on the back side of the holder 20. The fixed portion 262 includes first and second free end portions 264 and 266 extending therefrom in two directions. The first free end portion 264 located at the obliquely downward extending end of the fixed portion 262 is brought into contact with the top of the chassis 130a of the liquid-crystal unit 130, when the holder 20 is mounted on the instrument body 10. The second free end portion 266 located at the obliquely and laterally extending end of the fixed portion 262 is brought into contact with the chassis of the instrument body 10, when the holder 20 is mounted on the instrument body 10. Thus, the chassis 130a of the liquid-crystal unit 130 is connected to the chassis of the instrument body 10 through the first free end portion 264, fixed portion 262 and second free end portion 266. In such a manner, the static electricity can be prevented effectively from being produced.

<Second Embodiments>

General Layout of On-Vehicle Sound Instrument

Figure 16:
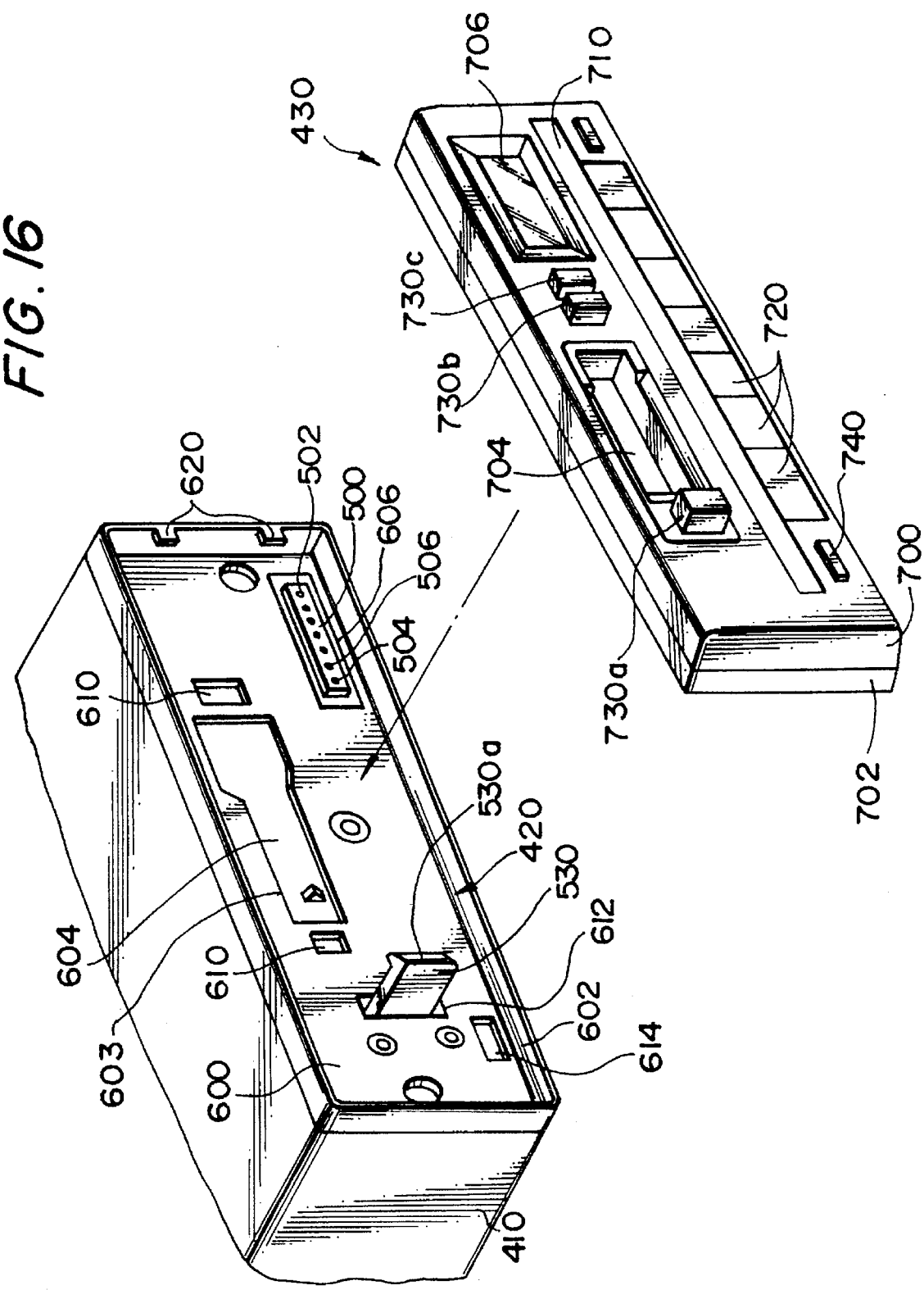
FIG. 16 is a schematic view of an on-vehicle sound instrument constructed in accordance with the second embodiment of the present invention with the face plate removed from the instrument body.

Referring to FIG. 16, a car radio generally comprises an instrument body 410 fixed on a vehicle and a portable face plate 430 detachable from the instrument body 410. The instrument body 410 includes the face plate 430 and a removable holder 420 fixed thereon at the front face. The holder 420 comprises a holder plate 600 located opposite to the back side of the face plate 430 and a square-shaped frame portion 602 standing from the holder plate 600 at the edge portion thereof in the forward position relative to the holder plate 600.

As shown in FIG. 16, the face plate 430 includes a front panel 700 and a back lid panel 702, which are superposed with each other. The face plate 430 may also include a cassette insertion window 704 and a liquid-crystal display portion 706 disposed adjacent to the right side of the cassette insertion window 704. A liquid-crystal display device (LCD) which is described, is disposed behind the liquid-crystal display portion 706. The face plate 430 further includes a light guide 710 extending crosswise and a plurality of operation keys 720 arranged parallel to the light guide 710. The operation keys 720 activate various switches 760 which is described, these switches being disposed between the front panel 700 and the back lid panel 702. The operation keys 720 can be manipulated to activate these switches 102 for doing the power-on to the instrument body 10, the choice of preset and tuned frequencies, the switching between local and distance, the choice of bands, the input to various electronic tuning, note, tone and balance volumes and so on.

Figure 17A:
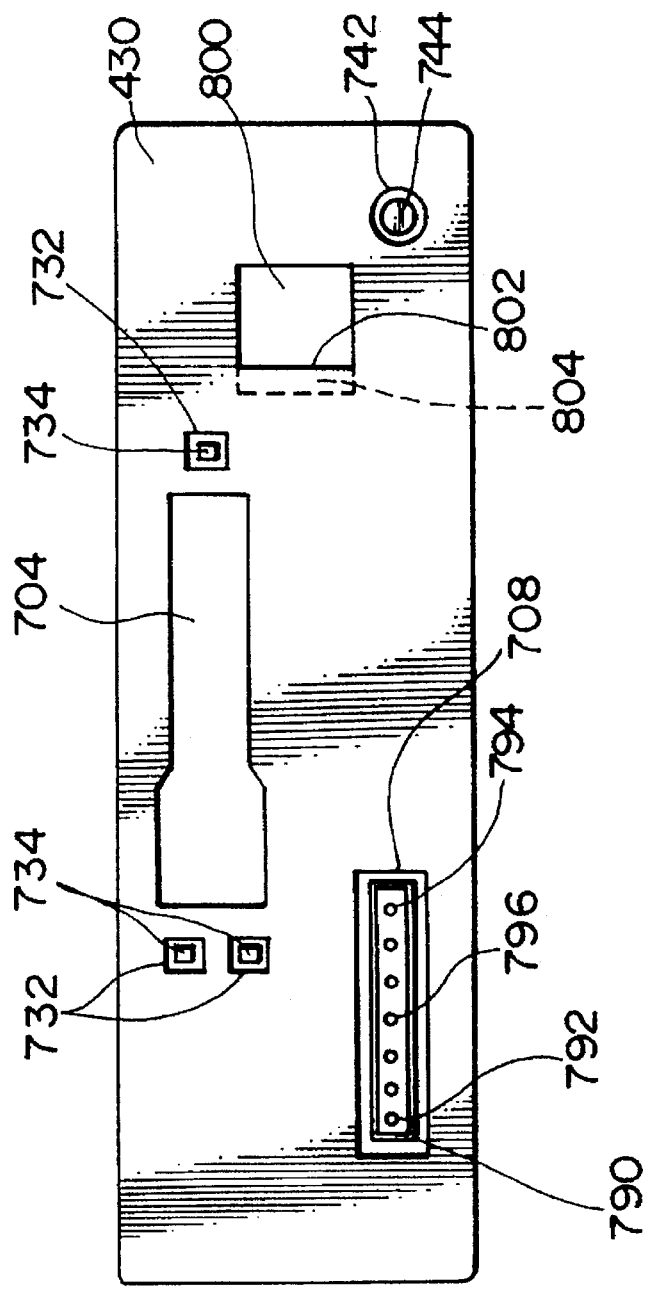
FIG. 17A is a back view of the face plate shown in FIG. 16

The face plate 430 may further include an ejection key 730a disposed on the left side of the cassette insertion window 704 and FF and REW keys 730b, 730c as adjacent the right side thereof. As shown in FIG. 17A, the keys 730a–730c can be used to drive shafts 734 integrally formed therewith. As shown in FIG. 17A, the back side of the face plate 430 includes apertures 732 through which the respective shafts 734 pass.

The face plate 430 further includes a release key 740 for releasing the face plate 430 from a holder 420. As shown in FIG. 17A, the release key 740 is used to drive a shaft 744 integrally formed therewith. The face plate 430 includes an aperture 742 through which the shaft 744 pass.

As shown in FIG. 17A, the back side of the face plate 430 further includes a second connector 790 formed therein. The second connector 790 is connected to a first connector 500 in the instrument body 410, when the face plate 430 is mounted on the instrument body 410. The second connector 790 includes an array of terminals which includes a first terminal 792 at one end, a N-th terminal 794 at the opposite end and intermediate terminals 796 between the first and N-th terminals.

On the other hand, the holder plate 600 of the holder 420 includes a cassette insertion window 603 formed therethrough and a dust cover 604 for opening and closing the window 603. The holder plate 600 also includes a connector opening 606 through which the first connector 500 is exposed. The first connector 500 includes an array of terminals which includes a first terminal 502 at one end, a N-th terminal 504 at the opposite end and intermediate terminals 506 between the first and N-th terminals.

The holder plate 600 further includes openings 610, 612 and 614 formed therethrough. The opening 610 permits the shaft 734 to extend externally therethrough when the keys 730a–730c of the face plate 430 are activated. The opening 614 permits the shaft 744 to extend externally therethrough when the release key 740 of the face plate 430 is activated. The opening 612 permits a hold lever 530 for holding the face plate 430 to extend externally from the hold plate 600.

The holder 420 has two pawls 620 extending inwardly from the right side wall of the frame portion 602, for example. These pawls 620 co-operate with the hold lever 530 to form a structure for holding the face plate 430.

Figure 17B:
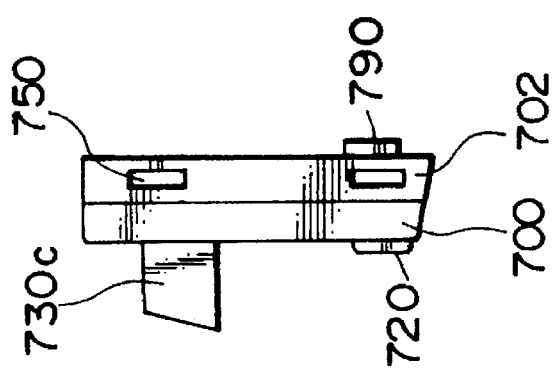
FIG. 17B is a side view of the same face plate.

The mounting and dismounting of the face plate 430 through the holding structure is described with reference to FIG. 18. FIG. 18 shows the face plate 430 placed at its initial mounting state or at its final dismounting state. As shown in FIG. 17B, the face plate 430 includes engagement apertures 750 which are engaged with the pawls 620 in the frame portion 602 of the holder 420. The face plate 430 further includes a recess 800 formed therein at the back side. The recess 800 has one end in which a projection 802 is formed opposite to the bottom thereof. Thus, an undercut portion 804 is formed between the bottom of the recess 800 and the projection 802.

To mount the face plate 430 on the instrument body 410, the engagement apertures 750 of the face plate 430 are engaged with the pawls 620 of the holder 420. A pawl 530a formed in the tip of the hold lever 530 extending from the instrument body 410 is then inserted into the undercut 804 of the face plate 430 until the pawl 530a contacts the back side of the projection 802. Such a situation is shown in FIG. 18. The face plate 430 is then rotated toward the instrument body 410 around a fulcrum at which the engagement apertures 750 of the face plate 430 are engaged with the pawls 620 of the holder 420. As shown in FIG. 18, thus, the hold lever 530 is moved backward in the direction of an arrow and then locked in place to complete the mounting of the face plate 430 on the instrument body 410.

When the face plate 430 is to be dismounted from the instrument body 410, the release key 740 on the face plate 430 is manipulated. The shaft 744 is then extended to unlock the hold lever 530 which is in turn moved forward to the state of FIG. 18 by a spring which is described. By disengaging the pawls 620 of the holder 410 and the pawl 530a, it is possible to dismount the face plate 430 from the instrument body 410.

Control System Including Start Setting Means

When the face plate 430 of this embodiment is mounted on the instrument body 410 in the manner mentioned above, the first and the second connectors 500 and 790 are connected to each other. In this embodiment, start setting means is provided to avoid any disturbance produced depending on the sequence of connection between the terminals of the first and the second connectors 500 and 790 in the instrument body and the face plate 410, 430. A control system including such a start setting means is described with reference to FIG. 19.

Figure 19:
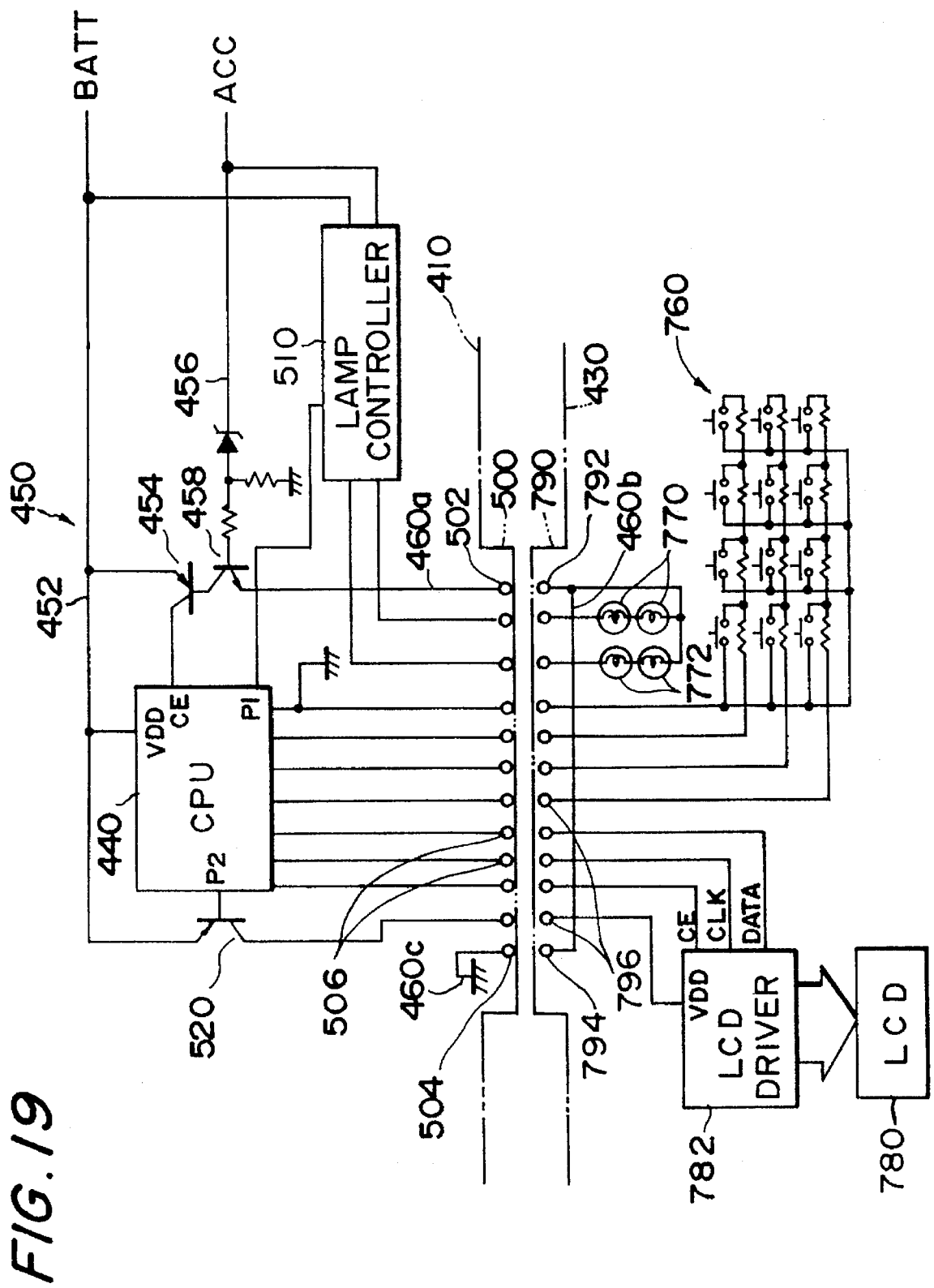
FIG. 19 is a block diagram of the control system shown in FIG. 16, including the start setting means.

Referring to FIG. 19, the instrument body 410 comprises a CPU 440 which is formed by a microcomputer for controlling the car radio. The CPU 440 has a power input terminal VDD to which a voltage of five volts, for example, is always applied through a battery supply line 452. The CPU 440 also has a chip enable terminal CE. The essential requirement of starting the CPU 440 is that a voltage (e.g., five volts) is applied to the chip enable terminal CE. The start setting means 450 of this embodiment can apply the voltage of five volts to the chip enable terminal CE of the CPU 440 only when the first terminals 502 and 792 of the first and the second connectors 500 and 790 are brought into contact with each other, while at the same time the N-th terminals 504 and 794 thereof are brought into contact with each other.

The chip enable terminal CE of the CPU 440 is connected to the battery supply line 452 through a first transistor 454 (e.g., PNP type). A second transistor 458 (e.g., NPN type) is also provided to turn the first transistor 454 on and off. The base of the second transistor 458 is connected to the accessory power supply line 456. The collector of the second transistor 458 is connected to the base of the first transistor 454. The emitter of the second transistor 458 is connected to the first terminal 502 of the first connector 500 through an earth line 460a. In the second connector 790 of the face plate 430, the first and N-th terminals 792, 794 are connected to each other by an earth line 460b. The N-th terminal 504 of the first connector 500 in the instrument body 410 is connected to the ground through an earth line 460c.

The first transistor 454 located in the power supply line of the chip enable terminal CE in the CPU 440 is turned on when its base potential becomes low. In this embodiment, the emitter potential of the second transistor 458 can be ground potential only when the first terminals 502, 792 of the first and the second connectors are connected with each other and at the same time the N-th terminals 504, 794 thereof are connected to each other. When the second transistor 458 is turned on by applying the power from the accessory power supply line 456 to the second transistor 458, the base potential of the first transistor 454 can be low. Only when the above requirements are fulfilled, the voltage of five volts can be applied to the chip enable terminal CE to start the CPU 440. In other cases where only the first terminals 502 and 792 are brought into contact with each other or where only the N-th terminals 504 and 794 are brought into contact with each other, the CPU 440 is not activated. When the first terminal 502 is brought into contact with the first terminal 792 and the Nth-terminal 506 with the Nth-terminal 794, the intermediate terminals 506 and 796 always contact each other unless there is any failure in connection. Therefore, there is no contact between the corresponding terminals after the CPU 440 has been placed at the startable state. This can avoid any disturbance produced depending on the sequence of connection between the terminals as in the prior art.

The terminal P1 of the CPU 440 outputs a light-on start command to a lamp controller 510 in the instrument body 410. The lamp controller 510 energizes lamps 770 and 772 in the face plate 430. The lamp 770 functions as a back-light source for a liquid-crystal display 780 while the lamp 772 is a source of illumination for energizing the light guide 710 in the face plate 430. Each of the lamps 770 and 772 is connected at one end to the lamp controller 510 through the two terminals in the respective terminals 506, 796 of the first and the second connectors 500, 790, the other end thereof being connected to the earth through the first terminal 792.

The CPU 440 can recognize the states of the switches 760 activated by the operation keys 720 through the four terminals in the respective terminal groups 506, 796 of the first and the second connectors 500, 790. The switches 760 are connected to one another in matrix, for example, of four columns and three lines, all the switches 760 being connected at one end to a common addressing ground line. Each of the switches 760 is further connected to three address lines for every line through a resistor. If a switch 760 is turned on, the resistance in the address line in which that switch is present changes so that the CPU 440 can recognize which switch is activated.

The four terminals in the respective terminal groups 506, 796 in the first and the second connectors 500, 790 are used to drive the liquid-crystal display 780. A liquid-crystal driver 782 is provided for driving the liquid-crystal display 780. The power input terminal VDD, chip enable terminal CE, clock input terminal CLK and data input terminal DATA are respectively connected to four terminals in the terminal group 796 of the second connector 790. The power input terminal VDD of the liquid-crystal driver 782 is adapted to be connected to the power supply line 452 through a third transistor 520 which is turned on by the output of the terminal P2 after the CPU 440 has been started.

Since the four terminals in the second connector 790 connected to the liquid-crystal driver 782 are not connected to the CPU 440 after the CPU 440 is started, any disturbance to the liquid-crystal display 780 can be avoided.

The start setting means 450 does not necessarily have to be in the condition to start the CPU 440, as long as the instrument body 410 can be placed in the startable state after the first terminals 502, 792 in the first and the second connectors 500, 790 are brought into contact with each other and at the same time the N-th terminals 504, 794 thereof are brought into contact with each other. For example, the power switch signal line in the face plate 430 may be connected to the instrument body 410 only when the above conditions of connection in the first and the second connectors 500, 790 are fulfilled.

Hold Lever Drive Mechanism

Figure 20:
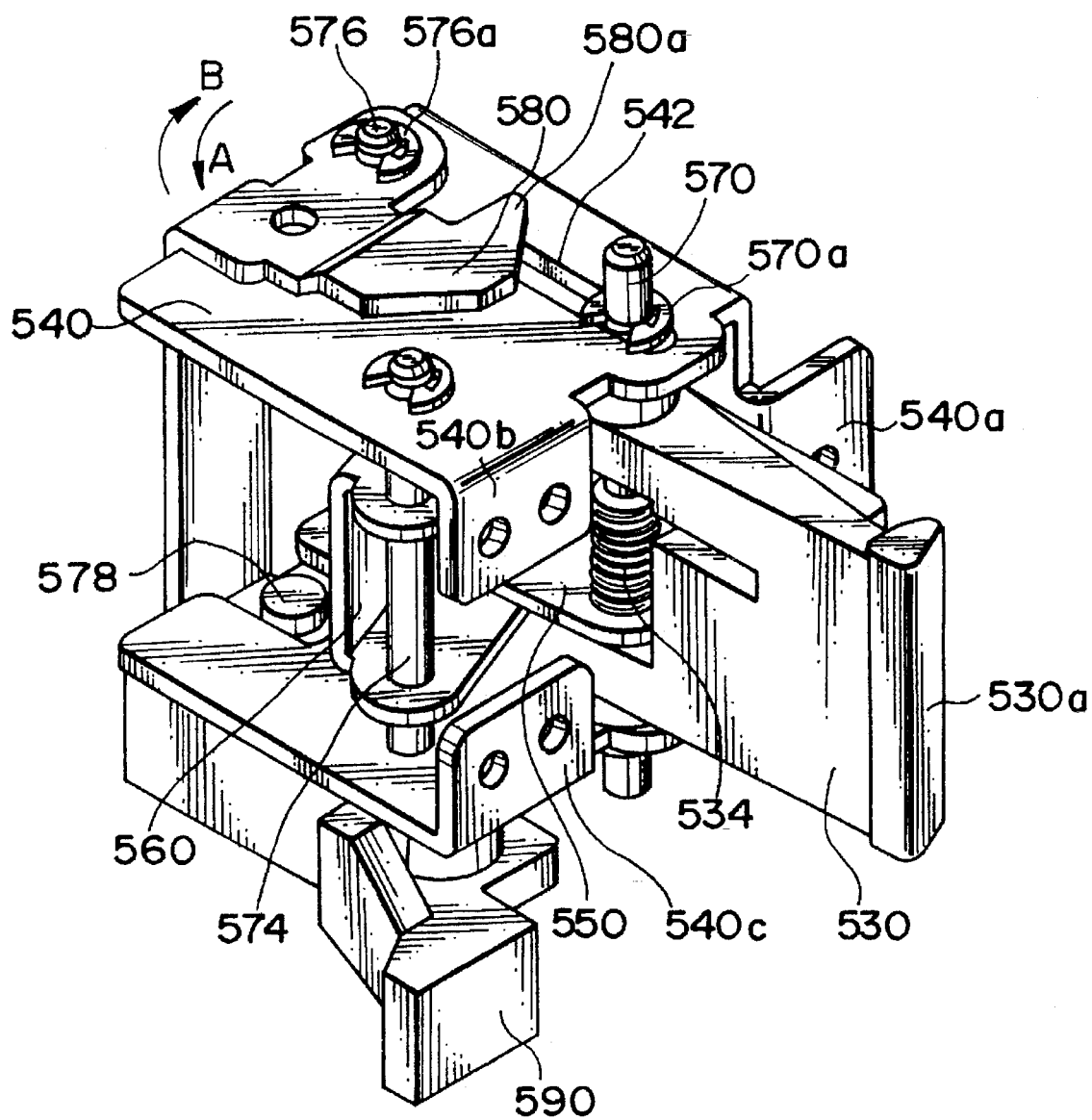
FIG. 20 is a schematic and perspective view of a hold lever for holding the face plate and its drive mechanism.
Figure 21:
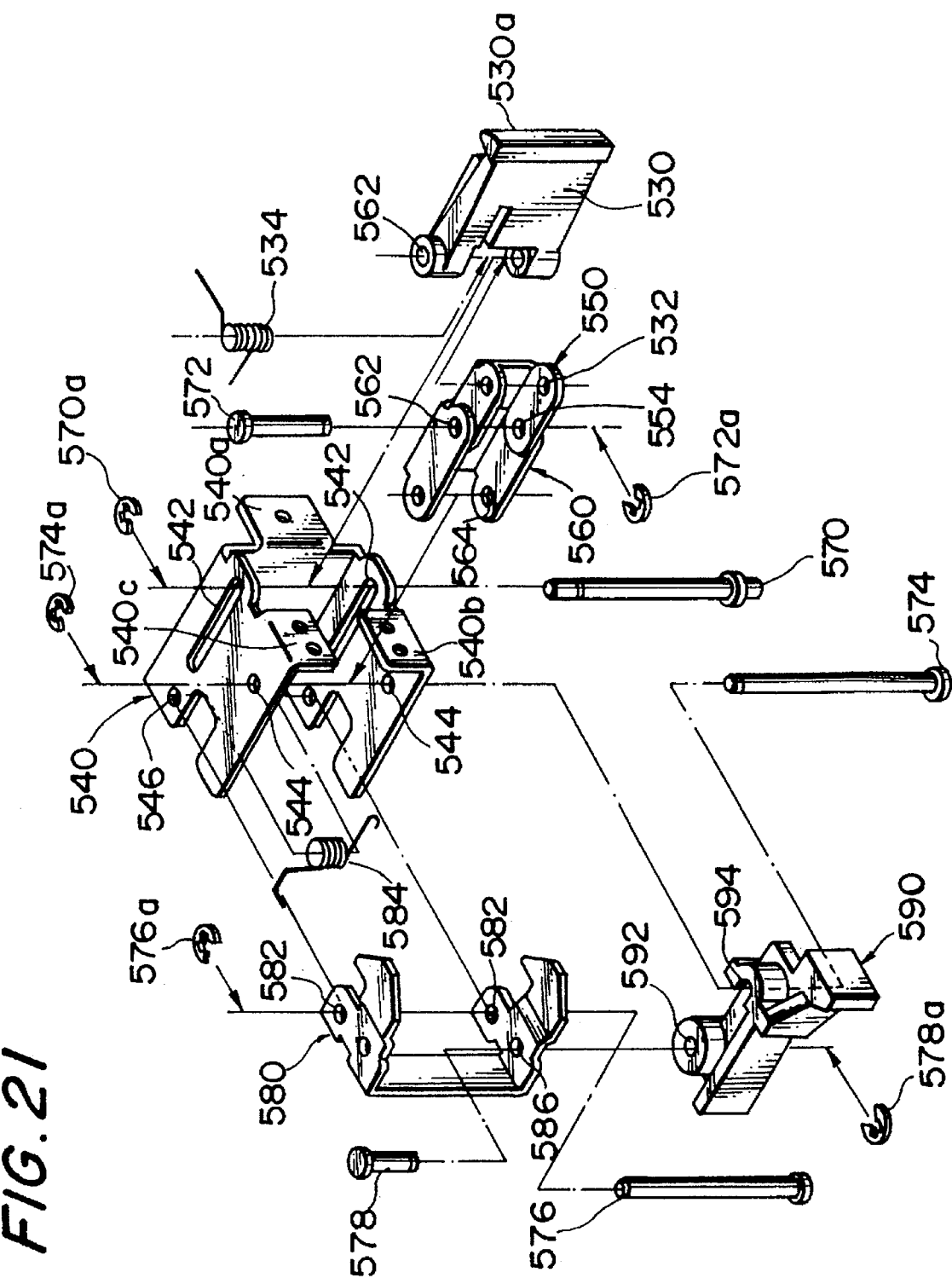
FIG. 21 is a perspective view of the assembly of the hold lever mechanism shown in FIG. 20.

A mechanism for driving the hold lever 530 maintains the face plate 430 at its mounted state and prevents the face plate 30 from falling when it is removed from the instrument body. This mechanism is described with reference to FIGS. 20–22.

The mechanism generally comprises a lever holding fitting 540, first and second arms 550, 560, a stopper 580 and a release arm 590. The lever holding fitting 540 is fixed on the chassis of the instrument body 410 through three mounting pieces 540a–540c. The lever holding fitting 540 has a groove 542 for guiding the hold lever 530 for movement. The hold lever 530 is pin-joined to the first arm 550, when a first pin 570 is passed through holes 532 and 542 formed therein and an E-shaped ring 570a is mounted on the pin 570 at its tip. The opposite ends of the first pin 570 is passed through the groove 542 in the lever holding fitting 540. The first pin 570 is also passed through a first spring 534 which in turn biases the hold lever 530 and the first arm 550 to increase the angle formed therebetween.

The first and the second arms 550, 560 are pin-joined to each other, when a second pin 572 is passed through holes 554 and 562 formed therein and an E-shaped ring 572a is mounted on the second pin 572 at its tip. The second pin 572 is movable within the lever holding fitting 540.

The second arm 560 is pin-joined to the lever holding fitting 540 by passing a third pin 574 through holes 544 and 564 formed therein and mounting an E-shaped ring 574a on the third pin 574 at its tip.

Figure 22:
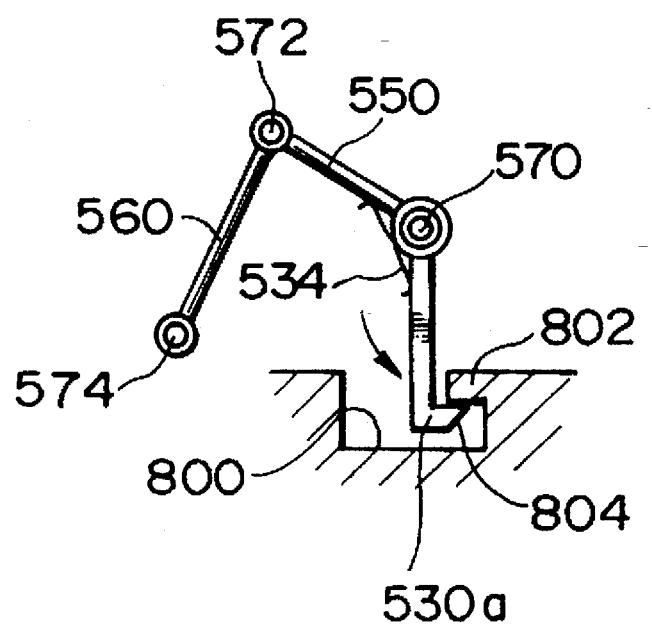
FIG. 22 is a schematic view illustrating the face plate held by the hold lever shown in FIG. 20.

FIG. 22 shows the face plate 430 after it is mounted and locked on the instrument body 410. The hold lever 530 reduces the angle formed between the hold lever 530 and the first arm 550 and the force of the first spring 534 is increased as the hold lever 530 is moved toward the instrument body 410. This increases the force of engagement between the pawl 530a of the hold lever 530 and the projection 802 of the face plate 430.

This mechanism for driving the hold lever 530 includes a stopper 580 for locking the hold lever 530 at a position in which the hold lever 530 is closest to the instrument body 410. The stopper 580 is supported for rotation relative to the lever holding fitting 540 in the directions as shown by arrows A and B in FIG. 20. The stopper 580 includes a pawl 580a for stopping and maintaining the first pin 570 moved backward along the groove 542 of the lever holding fitting 540 in place, when the face plate 430 is mounted on the instrument body 410. The lever holding fitting 540 is pin-joined to the stopper 580 when a fourth pin 576 is passed through holes 546 and 582 formed therein and an E-shaped ring 576a is mounted on the pin 576 at its tip. The fourth pin 576 is also passed through a second spring 584 which in turn biases the stopper 580 in the direction as shown by arrow A in FIG. 20.

A release arm 590 for disengaging the stopper 580 from the first pin 570 is provided. A fifth pin 578 is passed through a hole 592 formed in the release arm 590 and another hole 586 formed in the stopper 580 at a position a distance away from the pivot point thereof. An E-shaped ring 578a is mounted on the fifth pin 578 at its tip to pin-join the stopper 580 with the release arm 590. The release arm 590 includes an elongate slot-shaped groove 594 through which the third pin 574 can be passed.

The release arm 590 is biased toward the stopper 580 and held at a position near the opening 614 in the holder plate 600 under the action of the second spring 584. When a release key 740 in the face plate 430 is activated, a shaft 744 integrally formed in the key 740 urges the release arm 590. Thus, the release arm 590 can rotate the stopper 580 in the direction as shown by arrow B in FIG. 20 against the biasing force of the second spring 584. Therefore, the stopper 580 can be disengaged from the first pin 570. The first spring 534 forces the hold lever 530 to move forward and thus pushes the face plate 430 with the hold lever 530 as a unit. As a result, the face plate 430 is set to such a state as shown in FIG. 18. Under such a state, the entire face plate 430 can be moved leftward as viewed in FIG. 18 against the force of the first spring 534 to disengage the pawl 620 of the holder 420 from the face plate 430. As the face plate 430 is then moved rightward, the engagement between the hold lever 530 and the projection 802 of the face plate 430 can be released to separate the face plate 430 completely from the instrument body 410.

The present invention is not limited to the aforementioned embodiments, but may be applied to any other form such as a cassette player, digital audio tape player, CD player or its combination with a radio.

We claim:

1. An on-vehicle sound instrument comprising:
   an instrument body fixedly mountable on a vehicle;
   a portable face plate detachably mounted on said instrument body;
   said face plate including a plurality of operation keys for activating said instrument body in various modes;
   said instrument body having all electronic parts for outputting and adjusting sound signals, including switches activated by said operation keys; and
   start setting means for placing said instrument body in a startable state only when said face plate is mounted on said instrument body.

2. An on-vehicle sound instrument as defined in claim 1 wherein said start setting means includes a switch having a movable contact urged by said face plate when said face plate is mounted on said instrument body, said switch being activated to set said instrument body in the startable state.

3. An on-vehicle sound instrument as defined in claim 2 wherein said instrument body has a microcomputer having a chip enable terminal, said microcomputer being started when power is supplied to said chip enable terminal through a power supply line and wherein said switch is connected to said power supply line to said chip enable terminal.

4. An on-vehicle sound instrument as defined in claim 1 wherein said start setting means includes a voltage dividing circuit having a plurality of resistors, said voltage dividing circuit dividing a voltage used to set said instrument body in the startable state and wherein part of said resistors is disposed in said instrument body, the rest of said resistors being disposed in said face plate, whereby said resistors can be connected to one another to form said voltage dividing circuit when said face plate is mounted on said instrument body.

5. An on-vehicle sound instrument as defined in claim 4 wherein said instrument body has a microcomputer including an analog/digital converter and a port for said converter, said microcomputer being started when a voltage within an appropriate range is applied to said port through a power supply line and wherein said voltage dividing circuit is connected to the power supply line leading to said port, the voltage within said appropriate range being applied to said port after the voltage is divided by said voltage dividing circuit.

6. An on-vehicle sound instrument as defined in claim 1 wherein said instrument body comprises a holder on which said face plate is detachably mounted, said holder having a holder plate located to face a back side of said face plate and a frame portion extending forward from edges of said holder plate, said frame portion including engaging portions formed therein at opposite crosswise ends of said holder and wherein said face plate comprises a fixed portion to be engaged with one engaging portion in said holder, a movable portion to be engaged with another engaging portion in said holder, and a release lever for disengaging the movable portion from said another engaging portion in said holder.

7. An on-vehicle sound instrument as defined in claim 6 wherein said holder has a spring for urging said face plate toward a position in which said face plate is in a jumped-out state.

8. An on-vehicle sound instrument as defined in claim 7 wherein said start setting means includes a switch having a movable contact urged by said face plate when said face plate is mounted on said instrument body, said switch being activated to set said instrument body in the startable state and wherein said spring also functions as said movable contact.

9. An on-vehicle sound instrument as defined in claim 7 wherein said start setting means includes a voltage dividing circuit having a plurality of resistors, said voltage dividing circuit dividing a voltage used to set said instrument body in the startable state, part of said resistors being disposed in said instrument body, the rest of said resistors being disposed in said face plate and wherein said holder includes a plurality of contacts for connecting the opposite ends of said resistor disposed in said face plate to said instrument body when said face plate is mounted on said instrument body, a plurality of said springs also functioning as said contacts.

10. An on-vehicle sound instrument as defined in claim 8 wherein a back side of said holder plate includes a first electrode on which said spring is fixedly mounted and a second electrode with which said spring makes contact and wherein said holder plate includes an opening formed therethrough, said spring having a projection extending through said opening whereby the contact between said spring and said second electrode can be removed when said face plate is mounted on said holder and urges said projection.

11. An on-vehicle sound instrument as defined in claim 10, further comprising a plurality of said springs, each of which being engageable with said second electrode, said start setting means setting said instrument body in the startable state when the projections of all the springs are urged to separate all said springs from said second electrode.

12. An on-vehicle sound instrument as defined in claim 10, further comprising a protection circuit connected to a power supply line leading to a chip enable terminal of a microcomputer, said protection circuit preventing a high voltage due to a static electricity from being applied to the chip enable terminal through said projections.

13. An on-vehicle sound instrument as defined in claim 10 wherein said projection extends outwardly at a position which is offset from a central crosswise position of said holder toward an end of said holder with which said movable portion of said face plate is engaged.

14. An on-vehicle sound instrument as defined in claim 9 wherein a back side of said holder plate includes a plurality of electrodes to which a plurality of said springs are respectively fixed and wherein said holder plate includes a plurality of openings formed therethrough, each of said springs having a projection extending forward through a corresponding one of said openings whereby opposite ends of said resistor in said face plate can be brought into contact with said projections when said face plate is mounted on said holder.

15. An on-vehicle sound instrument as defined in claim 14 wherein each of said projections extends outwardly at a position which is offset from a central crosswise position of said holder toward an end of said holder with which said movable portion of said face plate is engaged.

16. An on-vehicle sound instrument as defined in claim 6 wherein said face plate has a protruding portion formed therein at a position opposite to the frame portion of said holder, the frame portion of said holder including a stopper groove formed therein for guiding and limiting the movement of said protruding portion to a point at which said stopper groove does not reach a forward edge of said frame portion.

17. An on-vehicle sound instrument as defined in claim 16 wherein said stopper groove is formed in said holder at a position offset from a central crosswise position of said holder toward an end of said holder with which the fixed portion of said face plate is engaged.

18. An on-vehicle sound instrument as defined in claim 1 wherein said face plate comprises a front panel and a back lid panel fixedly mounted on a back side of the front panel and wherein said operation keys are held between said front panel and said back lid panel, each of the operation keys being provided with a shaft which is extended outwardly from said back lid panel to activate the switches when any manipulation is carried out on the front panel, said front and back lid panels including means for biasing said shaft forwardly so that said shaft does not accidentally extend outwardly from said back lid panel.

19. An on-vehicle sound instrument as defined in claim 18 wherein said biasing means is formed of a porous cushion material.

20. An on-vehicle sound instrument as defined in claim 19 wherein said porous cushion material is located along an array of said operation keys arranged in a line.

21. An on-vehicle sound instrument comprising:
an instrument body fixedly mountable on a vehicle;
a portable face plate detachably mounted on said instrument body;
said instrument body having a first connector including a plurality of terminals disposed in an array;
said face plate comprising:
  a second connector having a plurality of terminals disposed in an array, each of which is connected to a respective one of said terminals in said first connector;
  a plurality of operation keys for activating said instrument body in various operational modes;
  a plurality of switches, each of which is activated by a corresponding one of said operation keys; and
  a circuit board on which said switches are mounted, said circuit board connecting said switches and said second connector;
said on-vehicle sound instrument further comprising start setting means for placing said instrument body in a startable state only when said terminals of said first and second connectors are connected to one another at opposite ends of said arrays.

22. An on-vehicle sound instrument as defined in claim 21 wherein said face plate includes a liquid-crystal display section driven by signals from said instrument body and wherein each of said first and second connectors includes liquid-crystal drive terminals located between said terminals at the opposite ends of the arrays.

23. An on-vehicle sound instrument as defined in claim 21 wherein said instrument body includes a microcomputer having a chip enable terminal, said microcomputer being started when a voltage is applied to said chip enable terminal through a power supply line and wherein said start setting means can supply the power to said chip enable terminal only when said terminals of said first and second connectors are brought into contact with one another at the opposite ends of the arrays.

24. An on-vehicle sound instrument as defined in claim 21 wherein said instrument body includes a holder on which said face plate is detachably mounted, said holder including an engaging portion at one end and wherein said face plate includes a portion to be engaged with said engaging portion, said portion to be engaged being formed in said face plate at one end of said face plate whereby said face plate can be mounted on or dismounted from said instrument body when said face plate is rotated around a point at which said engaging portion and said portion to be engaged are engaged with each other.

* * * * *